US011862057B2

(12) United States Patent
Jung et al.

(10) Patent No.: US 11,862,057 B2
(45) Date of Patent: Jan. 2, 2024

(54) GATE DRIVER AND DISPLAY DEVICE USING THE SAME

(71) Applicant: LG Display Co., Ltd., Seoul (KR)

(72) Inventors: Jin Woo Jung, Paju-si (KR); Seung Jin Yoo, Paju-si (KR); Hyun Gi Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/961,408

(22) Filed: Oct. 6, 2022

(65) Prior Publication Data

US 2023/0215306 A1 Jul. 6, 2023

(30) Foreign Application Priority Data

Dec. 30, 2021 (KR) ........................ 10-2021-0191991

(51) Int. Cl.
*G09G 3/00* (2006.01)
*G09G 3/3291* (2016.01)

(52) U.S. Cl.
CPC ........... *G09G 3/006* (2013.01); *G09G 3/3291* (2013.01); *G09G 2310/08* (2013.01); *G09G 2330/12* (2013.01)

(58) Field of Classification Search
CPC ................. G09G 3/3233; G09G 3/006; G09G 2320/043; G09G 2320/0233; G09G 2320/029; G09G 2320/045; G09G 2320/0295; G09G 2320/0693;
(Continued)

(56) References Cited

U.S. PATENT DOCUMENTS

| | | | |
|---|---|---|---|
| 10,467,960 B2 | 11/2019 | Do et al. |
| 11,107,418 B2 | 8/2021 | Pyun et al. |
| 11,151,925 B2 | 10/2021 | Park et al. |

(Continued)

FOREIGN PATENT DOCUMENTS

| | | | |
|---|---|---|---|
| GB | 2611153 A | 3/2023 |
| JP | 2004-004673 A | 1/2004 |

(Continued)

OTHER PUBLICATIONS

European Patent Office, Extended European Search Report, European Patent Application No. 22207968.3, dated Jun. 1, 2023, 12 pages.

(Continued)

*Primary Examiner* — Dong Hui Liang
(74) *Attorney, Agent, or Firm* — Fenwick & West LLP

(57) ABSTRACT

A display device comprises: pixels connected to a power line to which a pixel driving voltage is supplied; data lines that extend in a first direction and are connected to the pixels, the data lines applying data voltages of an image to the pixels; gate lines that are connected to the pixels and extend in a second direction, the gate lines applying gate signals to the pixels; a data driver configured to supply the data voltages to the data lines during a display mode, and to supply sensing data to the data lines during a sensing mode; a gate driver configured to supply the gate signals to the gate lines; and a sensing circuit configured to sense current flowing through the power line that is connected to a subset of pixels from the pixels during the sensing mode, the subset of pixels arranged along the first direction.

20 Claims, 17 Drawing Sheets

(58) Field of Classification Search
CPC ... G09G 2320/0223; G09G 2300/0819; G09G 2300/043
See application file for complete search history.

(56) References Cited

U.S. PATENT DOCUMENTS

| | | | | |
|---|---|---|---|---|
| 2009/0207106 | A1* | 8/2009 | Mizukoshi | G09G 3/3233 345/76 |
| 2012/0019569 | A1* | 1/2012 | Byun | G09G 3/3233 345/77 |
| 2013/0050292 | A1* | 2/2013 | Mizukoshi | G09G 3/3233 345/77 |
| 2014/0152633 | A1* | 6/2014 | Park | G09G 3/3291 345/207 |
| 2014/0176401 | A1 | 6/2014 | Kim et al. | |
| 2015/0061981 | A1* | 3/2015 | Lee | G09G 3/3291 345/77 |
| 2015/0379940 | A1* | 12/2015 | Kishi | G09G 3/3291 345/77 |
| 2016/0358548 | A1* | 12/2016 | Matsuda | G09G 3/2011 |
| 2017/0132977 | A1 | 5/2017 | Kim | |
| 2018/0144717 | A1 | 5/2018 | Kim et al. | |
| 2019/0035331 | A1 | 1/2019 | Do et al. | |
| 2020/0202779 | A1 | 6/2020 | Chang | |
| 2020/0365091 | A1 | 11/2020 | Pyun et al. | |
| 2021/0183299 | A1 | 6/2021 | Park et al. | |

FOREIGN PATENT DOCUMENTS

| | | | |
|---|---|---|---|
| JP | 2008-151991 | A | 7/2008 |
| JP | 2019-028426 | A | 2/2019 |
| JP | 2021-096468 | A | 6/2021 |
| KR | 10-1548495 | B1 | 9/2015 |
| KR | 10-2020-0133044 | A | 11/2020 |

OTHER PUBLICATIONS

The Japan Patent Office, Office Action, Japanese Patent Application No. 2022-186095, dated Sep. 5, 2023, nine pages.

* cited by examiner

GATE DRIVER AND DISPLAY DEVICE USING THE SAME

CROSS-REFERENCE TO RELATED APPLICATION

This application claims priority to and the benefit of Republic of Korea Patent Application No. 10-2021-0191991, filed on Dec. 30, 2021, which is hereby incorporated herein by reference in its entirety.

BACKGROUND

1. Field of Technology

The present disclosure relates to a gate driver and a display device using the same.

2. Discussion of Related Art

Display devices includes a liquid crystal display (LCD) device, an electroluminescence display device, a field emission display (FED) device, a plasma display panel (PDP), and the like.

Electroluminescent display devices are divided into inorganic light emitting display devices and organic light emitting display devices according to a material of a light emitting layer. An active-matrix type organic light emitting display device reproduces an input image using a self-emissive element which emits light by itself, for example, an organic light emitting diode (hereinafter referred to as an "OLED"). An organic light emitting display device has advantages in that a response speed is fast and luminous efficiency, luminance, and a viewing angle are large.

Some of display devices, for example, a liquid crystal display device or an organic light emitting display device includes a display panel including a plurality of sub-pixels, a driver outputting a driving signal for driving the display panel, a power supply generating power to be supplied to the display panel or the driver, and the like. The driver includes a gate driver that supplies a scan signal or a gate signal to the display panel, and a data driver that supplies a data signal to the display panel.

In such a display device, when a driving signal such as a scan signal, an EM signal, and a data signal is supplied to a plurality of sub-pixels formed in the display panel, the selected sub-pixel transmits light or emits light directly to thereby display an image.

SUMMARY

In this case, each sub-pixel includes a driving thin film transistor (TFT) which controls a current flowing through a light-emitting element and one or more switch TFTs which switch the current. Deterioration due to long-time driving or the like of the driving TFT can occur, and a current sensing-based compensation method is applied to compensate for this deterioration. However, since the conventional sensing-based compensation method repeats a process of sensing an amount of current after writing data in one block of pixels, and then sensing the amount of current after writing data in a next block of pixels, there is a problem in that a sensing time required to sense entire blocks becomes longer.

The present disclosure is directed to solving all the above-described necessity and problems.

In one embodiment, a display device comprises: a plurality of pixels that are connected to a power line to which a pixel driving voltage is supplied, the plurality of pixels divided into a plurality of columns of pixel blocks that extend along a first direction and each pixel block including a different subset of pixels from the plurality of pixels, a plurality of data lines that extend in the first direction and are connected to the plurality of pixels, the plurality of data lines applying a plurality of data voltages of pixel data of an image to the plurality of pixels; a plurality of gate lines that are connected to the plurality of pixels and extend in a second direction that intersects the first direction, the plurality of gate lines applying gate signals to the plurality of pixels; a data driver configured to supply the plurality of data voltages of the image to the plurality of data lines during a display mode, and to supply sensing data to the plurality of data lines during a sensing mode; a gate driver configured to supply the gate signals to the plurality of gate lines; and a sensing circuit configured to sense current flowing through the power line that is connected to a respective subset of pixels included in each pixel block included in a column of pixel blocks from the plurality of columns of pixel blocks during the sensing mode, each of the respective subset of pixels included in each pixel block supplied the sensing data during the sensing mode.

In one embodiment, a display device comprises: a plurality of pixels that are connected to a power line to which a pixel driving voltage is supplied; a plurality of data lines that extend in a first direction and are connected to the plurality of pixels, the plurality of data lines applying a plurality of data voltages of pixel data of an image to the plurality of pixels; a plurality of gate lines that are connected to the plurality of pixels and extend in a second direction that intersects the first direction, the plurality of gate lines applying gate signals to the plurality of pixels; a data driver configured to supply the plurality of data voltages of the image to the plurality of data lines during a display mode, and to supply sensing data to the plurality of data lines during a sensing mode; a gate driver configured to supply the gate signals to the plurality of gate lines; and a sensing circuit configured to sense current flowing through the power line that is connected to a subset of pixels from the plurality of pixels during the sensing mode, the subset of pixels arranged along the first direction.

In one embodiment, a sensing circuit comprises: a resistor; and a switch configured to serially connect the resistor to a power line that supplies a pixel driving voltage to a plurality of pixels of a display panel that are divided into a plurality of columns of pixel blocks during a sensing period, and configured to disconnect the resistor from the power line during a display period during which an image is displayed by the display panel, wherein the sensing circuit is configured to sequentially sense each pixel block included in a column of pixel blocks during the sensing period by measuring a current flowing through the power line connected to a subset of pixels from the plurality of the pixels included in a target pixel block from the column responsive to sensing data being applied to the subset of pixels during the sensing mode.

The present disclosure is directed to providing a gate driver in which a sensing time may be reduced and a display device including the same.

It should be noted that objects of the present disclosure are not limited to the above-described objects, and other objects of the present disclosure will be apparent to those skilled in the art from the following descriptions.

In the present disclosure, when driving in a sensing mode, since a sensing region is selected in a column direction along a direction of a data line, and then an emission control signal is sequentially applied in units of blocks in the sensing region to sense a current, a sensing time or a sensing tact time can be greatly shortened and consistency can be improved.

In the present disclosure, since a current flowing through a power line to which a pixel driving voltage is applied forms a path which bypasses a light-emitting element as a current path, light emission of the light-emitting element is suppressed, and accordingly, a visibility problem can be solved.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
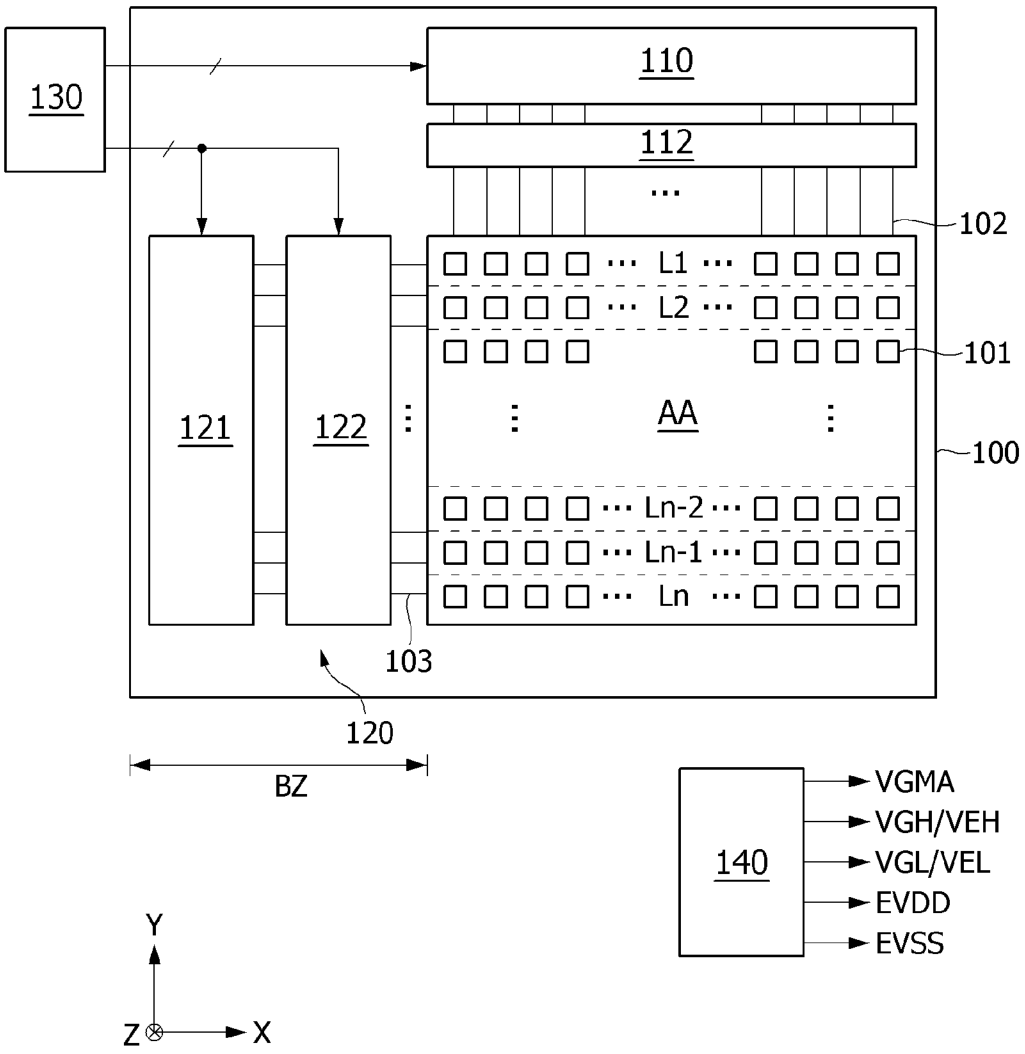
FIG. 1 is a block diagram illustrating a display device according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "comprising" used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The same reference numerals may refer to substantially the same elements throughout the present disclosure.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

Figure 2:
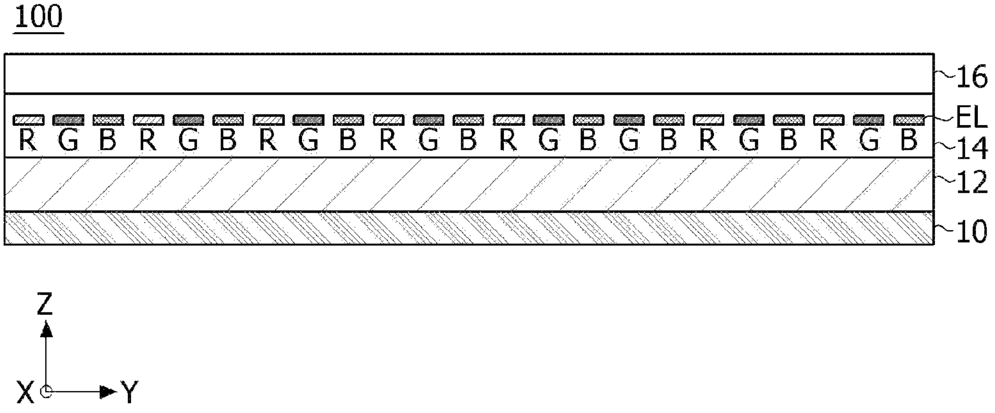
FIG. 2 is a view illustrating a cross-sectional structure of a display panel shown in FIG. 1 according to an embodiment of the present disclosure.

FIG. 1 is a block diagram illustrating a display device according to an embodiment of the present disclosure, and FIG. 2 is a diagram illustrating a cross-sectional structure of the display panel shown in FIG. 1 according to an embodiment of the present disclosure.

Referring to FIGS. 1 and 2, the display device according to an embodiment of the present disclosure includes a display panel 100, a display panel driver for writing pixel data to pixels of the display panel 100, and a power supply 140 for generating power necessary for driving the pixels and the display panel driver.

The display panel 100 may be a display panel having a rectangular structure having a length in an X-axis direction, a width in a Y-axis direction, and a thickness in a Z-axis direction. The display panel 100 includes a pixel array AA that displays an input image. The pixel array AA includes a plurality of data lines 102, a plurality of gate lines 103 intersected with the data lines 102, and pixels 101 arranged in a matrix form. The display panel 100 may further include power lines commonly connected to pixels. The power lines may include a power line to which a pixel driving voltage EVDD is applied, a power line to which an initialization voltage Vinit is applied, a power line to which a reference voltage Vref is applied, and a power line to which a low potential power voltage EVSS is applied. These power lines are commonly connected to the pixels.

The pixel array AA includes a plurality of pixel lines L1 to Ln. Each of the pixel lines L1 to Ln includes one line of pixels arranged along a line direction X in the pixel array AA of the display panel 100. Pixels arranged in one pixel line share the same gate line 103. Sub-pixels arranged in a column direction Y along a data line direction share the same data line 102. One horizontal period 1H is a time obtained by dividing one frame period by the total number of pixel lines L1 to Ln.

The display panel 100 may be implemented as a non-transmissive display panel or a transmissive display panel. The transmissive display panel may be applied to a transparent display device in which an image is displayed on a screen and an actual background may be seen.

The display panel 100 may be implemented as a flexible display panel. The flexible display panel may be made of a plastic OLED panel. An organic thin film may be disposed on a back plate of the plastic OLED panel, and the pixel array AA and light emitting element may be formed on the organic thin film.

To implement color, each of the pixels 101 may be divided into a red sub-pixel (hereinafter referred to as "R sub-pixel"), a green sub-pixel (hereinafter referred to as "G sub-pixel"), and a blue sub-pixel (hereinafter referred to as "B sub-pixel"). Each of the pixels may further include a white sub-pixel. Each of the sub-pixels includes a pixel circuit. The pixel circuit is connected to the data line, the gate line and power line.

The pixels may be arranged as real color pixels and pentile pixels. The pentile pixel may realize a higher resolution than the real color pixel by driving two sub-pixels having different colors as one pixel 101 using a preset pixel rendering algorithm. The pixel rendering algorithm may compensate for insufficient color representation in each pixel with a color of light emitted from an adjacent pixel.

Touch sensors may be disposed on the display panel 100. A touch input may be sensed using separate touch sensors or may be sensed through pixels. The touch sensors may be disposed as an on-cell type or an add-on type on the screen of the display panel or implemented as in-cell type touch sensors embedded in the pixel array AA.

As shown in FIG. 2, when viewed from a cross-sectional structure, the display panel 100 may include a circuit layer 12, a light emitting element layer 14, and an encapsulation layer 16 stacked on a substrate 10.

The circuit layer 12 may include a pixel circuit connected to wirings such as a data line, a gate line, and a power line, a gate driver (GIP) connected to the gate lines, and the like. The wirings and circuit elements of the circuit layer 12 may include a plurality of insulating layers, two or more metal layers separated with the insulating layer therebetween, and an active layer including a semiconductor material.

The light emitting element layer 14 may include a light emitting element EL driven by a pixel circuit. The light emitting element EL may include a red (R) light emitting element, a green (G) light emitting element, and a blue (B) light emitting element. The light emitting element layer 14 may include a white light emitting element and a color filter. The light emitting elements EL of the light emitting element layer 14 may be covered by a protective layer including an organic film and a passivation film.

The encapsulation layer 16 covers the light emitting element layer 14 to seal the circuit layer 12 and the light emitting element layer 14. The encapsulation layer 16 may have a multilayered insulating structure in which an organic film and an inorganic film are alternately stacked. The inorganic film blocks or at least reduces the penetration of moisture and oxygen. The organic film planarizes the surface of the inorganic film. When the organic film and the inorganic film are stacked in multiple layers, a movement path of moisture or oxygen becomes longer compared to a single layer, so that penetration of moisture and oxygen affecting the light emitting element layer 14 can be effectively blocked or at least reduced.

A touch sensor layer may be disposed on the encapsulation layer 16. The touch sensor layer may include capacitive type touch sensors that sense a touch input based on a change in capacitance before and after the touch input. The touch sensor layer may include metal wiring patterns and insulating layers forming the capacitance of the touch sensors. The capacitance of the touch sensor may be formed between the metal wiring patterns. A polarizing plate may be disposed on the touch sensor layer. The polarizing plate may improve visibility and contrast ratio by converting the polarization of external light reflected by metal of the touch sensor layer and the circuit layer 12. The polarizing plate may be implemented as a polarizing plate in which a linear polarizing plate and a phase delay film are bonded, or a circular polarizing plate. A cover glass may be adhered to the polarizing plate.

The display panel 100 may further include a touch sensor layer and a color filter layer stacked on the encapsulation layer 16. The color filter layer may include red, green, and blue color filters and a black matrix pattern. The color filter layer may replace the polarizing plate and increase the color purity by absorbing a part of the wavelength of light reflected from the circuit layer and the touch sensor layer. In this embodiment, by applying the color filter layer 20 having a higher light transmittance than the polarizing plate to the display panel, the light transmittance of the display panel PNL can be improved, and the thickness and flexibility of the display panel PNL can be improved. A cover glass may be adhered on the color filter layer.

The power supply 140 generates direct current (DC) power required for driving the pixel array AA and the display panel driver of the display panel 100 by using a DC-DC converter. The DC-DC converter may include a charge pump, a regulator, a buck converter, a boost converter, and the like. The power supply 140 may adjust a DC input voltage from a host system (not shown) and thereby generate DC voltages such as a gamma reference voltage VGMA, gate-on voltages VGH and VEH, gate-off voltages VGL and VEL, a pixel driving voltage EVDD, a pixel low-potential power supply voltage EVSS, a reference voltage Vref, an initial voltage Vinit, an anode voltage Vano, and the like. The gamma reference voltage VGMA is supplied to a data driver 110. The gate-on voltages VGH and VEH and the gate-off voltages VGL and VEL are supplied to a gate driver 120. The pixel driving voltage EVDD and the pixel low-potential power supply voltage EVSS, a reference voltage Vref, an initial voltage Vinit, an anode voltage Vano, and the like are commonly supplied to the pixels.

The display panel driver writes pixel data (digital data) of an input image to the pixels of the display panel 100 under the control of a timing controller (TCON) 130.

The display panel driver includes a data driver 110 and the gate driver 120. A display panel driver may further include a demultiplexer array 112 disposed between the data driver 110 and data lines 102.

The demultiplexer array 112 sequentially supplies data voltages output from channels of the data driver 110 to the data lines 102 using a plurality of demultiplexers (DEMUXs). The demultiplexers may include a plurality of switch elements disposed on the display panel 100. When the demultiplexers are disposed between output terminals of the data driver 110 and the data lines 102, the number of channels of the data driver 110 may be reduced. The demultiplexer array 112 may be omitted.

The display panel driving circuit may further include a touch sensor driver for driving the touch sensors. The touch sensor driver is omitted from FIG. 1. The touch sensor driver may be integrated into one drive integrated circuit (IC). In a mobile device or wearable device, the timing controller 130, the power supply 140, the data driver 110, the touch sensor driver, and the like may be integrated into one drive integrated circuit (IC).

A display panel driver may operate in a low-speed driving mode under the control of a timing controller (TCON) 130. The low-speed driving mode may be set to reduce power consumption of a display device when there is no change in an input image for a preset number of frames in analysis of the input image. In the low-speed driving mode, the power consumption of the display panel driving circuit and a display panel 100 may be reduced by lowering a refresh rate of pixels when a still image is input for a predetermined time or longer. A low-speed driving mode is not limited to a case in which a still image is input. For example, when the display device operates in a standby mode or when a user command or an input image is not input to a display panel driver for a predetermined time or more, the display panel driver may operate in the low-speed driving mode.

The data driver 110 generates a data voltage Vdata by converting pixel data of an input image received from the timing controller 130 with a gamma compensation voltage every frame period by using a digital to analog converter (DAC). The gamma reference voltage VGMA is divided for respective gray scales through a voltage divider circuit. The gamma compensation voltage divided from the gamma reference voltage VGMA is provided to the DAC of the data driver 110. The data voltage Vdata is outputted through the output buffer AMP in each of the channels of the data driver 110.

The gate driver 120 may include a scan driver 121, and an emission (EM) driver 122. The gate driver 120 may be implemented as a gate in panel (GIP) circuit formed directly on a circuit layer 12 of the display panel 100 together with the TFT array of the pixel array AA. The gate in panel (GIP) circuit may be disposed on a bezel area BZ that is a non-display area of the display panel 100 or dispersed in the pixel array on which an input image is reproduced. The gate driver 120 sequentially outputs gate signals to the gate lines 103 under the control of the timing controller 130. The gate driver 120 may sequentially supply the gate signals to the gate lines 103 by shifting the gate signals using a shift register. The gate signal may include scan pulses, emission control pulses (hereinafter referred to as “EM pulses”), initial pulses, and sensing pulses.

The shift register of the gate driver 120 outputs a pulse of the gate signal in response to a start pulse and a shift clock from the timing controller 130, and shifts the pulse according to the shift clock timing.

The timing controller 130 receives, from a host system (not shown), digital video data DATA of an input image and a timing signal synchronized therewith. The timing signal includes a vertical synchronization signal Vsync, a horizontal synchronization signal Hsync, a main clock CLK, a data enable signal DE, and the like. Because a vertical period and a horizontal period can be known by counting the data enable signal DE, the vertical synchronization signal Vsync and the horizontal synchronization signal Hsync may be omitted. The data enable signal DE has a cycle of one horizontal period (1H).

A host system may be any one of a television (TV) system, a tablet computer, notebook computer, a navigation system, a personal computer (PC), a home theater system, a mobile device, and a vehicle system. The host system may scale an image signal from a video source according to the resolution of the display panel 100 and transmit the image signal to a timing controller 130 together with the timing signal.

The timing controller 130 multiplies an input frame frequency by i and controls the operation timing of the display panel driving circuit with a frame frequency of the input frame frequency×i (i is a positive integer greater than 0) Hz. The input frame frequency is 60 Hz in the National Television Standards Committee (NTSC) scheme and 50 Hz in the (phase-alternating line (PAL) scheme. The timing controller 130 may lower a driving frequency of the display panel driver by lowering a frame frequency to a frequency between 1 Hz and 30 Hz to lower a refresh rate of pixels in the low-speed driving mode.

Based on the timing signals Vsync, Hsync, and DE received from the host system, the timing controller 130 generates a data timing control signal for controlling the operation timing of the data driver 110, a control signal for controlling the operation timing of the demultiplexer array 112, and a gate timing control signal for controlling the operation timing of the gate driver 120. The timing controller 130 controls an operation timing of the display panel driver to synchronize the data driver 110, the demultiplexer array 112, a touch sensor driver, and a gate driver 120.

The voltage level of the gate timing control signal outputted from the timing controller 130 may be converted into the gate-on voltages VGH and VEH and the gate-off voltages VGL and VEL through a level shifter (not shown) and then supplied to the gate driver 120. That is, the level shifter converts a low level voltage of the gate timing control signal into the gate-off voltages VGL and VEL and converts a high level voltage of the gate timing control signal into the gate-on voltages VGH and VEH. The gate timing signal includes the start pulse and the shift clock.

Due to process variations and device characteristic variations caused in a manufacturing process of the display panel 100, there may be a difference in electrical characteristics of the driving element between the pixels, and this difference may increase as a driving time of the pixels elapses. An internal compensation technology or an external compensation technology may be applied to an organic light-emitting diode display to compensate for the variations in electrical characteristics of a driving element between the pixels. The internal compensation technology samples a threshold voltage of the driving element for each sub-pixel using an internal compensation circuit implemented in each pixel circuit to compensate a gate-source voltage Vgs of the driving element as much as the threshold voltage. The external compensation technology senses in real time a current or voltage of the driving element which changes according to the electrical characteristics of the driving element using an external compensation circuit. The external compensation technology compensates the variation (or change) in the electrical characteristics of the driving element in each pixel in real time by modulating the pixel data (digital data) of the input image as much as the electric characteristic variation (or change) of the driving element sensed for each pixel. The display panel driver may drive the pixels using the external compensation technology and/or the internal compensation technology.

Figure 3:
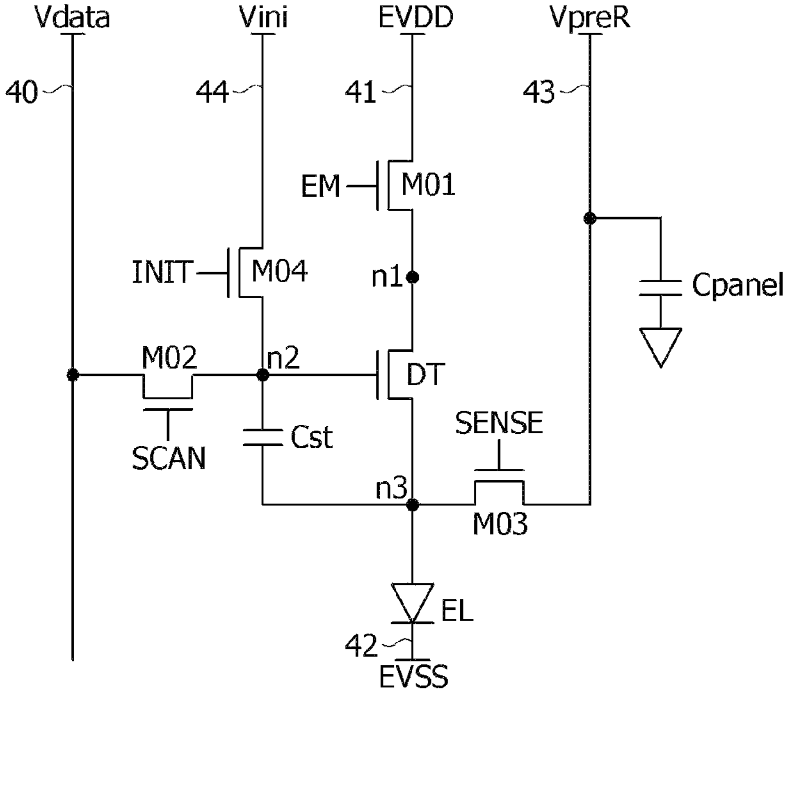
FIG. 3 is a circuit diagram illustrating a pixel circuit connected to an external compensation circuit according to an embodiment of the present disclosure.

FIG. 3 is a circuit diagram illustrating a pixel circuit connected to an external compensation circuit according to one embodiment of the present disclosure.

Referring to FIG. 3, the pixel circuit includes a light-emitting element EL, a driving element DT which supplies a current to the light-emitting element EL, a first switch element M01 which connects a pixel driving voltage line 41 in response to an emission control signal EM, a second switch element M02 which connects a data line 40 to node n2 in response to a scan signal SCAN, a capacitor Cst connected to a gate electrode of the driving element DT, a third switch element M03 which connects a reference voltage line 43 to node n3 in response to a sensing signal SENSE, and a fourth switch element M04 which connects an initialization voltage line 44 to node n2 in response to an initialization signal INIT.

A pixel driving voltage EVDD is applied to a first electrode of the driving element DT through a first power line 41. The driving element DT drives the light emitting element OLED by supplying a current to the light emitting element OLED according to a gate-source voltage Vgs. The light emitting element OLED is turned on and emits light when a forward voltage between an anode and a cathode of the light emitting element OLED is greater than or equal to a threshold voltage. A low potential voltage EVSS is applied to a cathode of the light-emitting element EL. The capacitor Cst is connected between the gate electrode and a second electrode of the driving element DT to maintain a gate-source voltage Vgs of the driving element DT.

The first switch element M01 is turned on according to a gate-on voltage of the emission control signal EM applied from a gate line to connect the pixel driving voltage line 41 to a first node n1.

The second switch element M02 is turned on according to a gate-on voltage of the scan signal SCAN applied from the gate line to connect the data line 40 to the gate electrode of the driving element DT and the capacitor Cst.

The third switch element M03 applies a reference voltage VpreR in response to the sensing signal SENSE. The reference voltage VpreR is applied to the pixel circuit through the reference voltage line 43.

The fourth switch element M04 is turned on according to a gate-on voltage of the initialization signal INIT to connect the initialization voltage line 44 to the gate electrode of the driving element DT and the capacitor Cst.

The light-emitting element EL may be implemented as an OLED. The OLED includes an organic compound layer formed between an anode and a cathode. The organic compound layer may include a hole injection layer (HIL), a hole transport layer (HTL), a light-emitting layer (EML), an electron transport layer (ETL), an electron injection layer (EIL), and the like, but is not limited thereto. The switch elements M01 and M02 may be implemented as n-channel oxide thin film transistors (TFTs).

An organic light emitting diode used as the light emitting element may have a tandem structure in which a plurality of light emitting layers are stacked. The organic light emitting diode having the tandem structure may improve the luminance and lifespan of the pixel.

In this case, in a sensing mode, a current flowing through a channel of the driving element DT or a voltage between the driving element DT and the light-emitting element EL is sensed through the reference voltage line 43. The current flowing through the reference voltage line 43 is converted to a voltage through an integrator and is converted to digital data through an analog-to-digital converter (ADC). This digital data is sensing data including a threshold voltage or mobility information of the driving element DT. The sensing data is transmitted to a data operation unit. The data operation unit may receive the sensing data from the analog-to-digital converter to compensate for driving deviation and deterioration of the pixels by adding or multiplying a compensation value selected based on the sensing data to the pixel data.

FIGS. 4 to 8 are views for describing an operation principle of a sensing circuit according to the embodiment.

Figure 4:
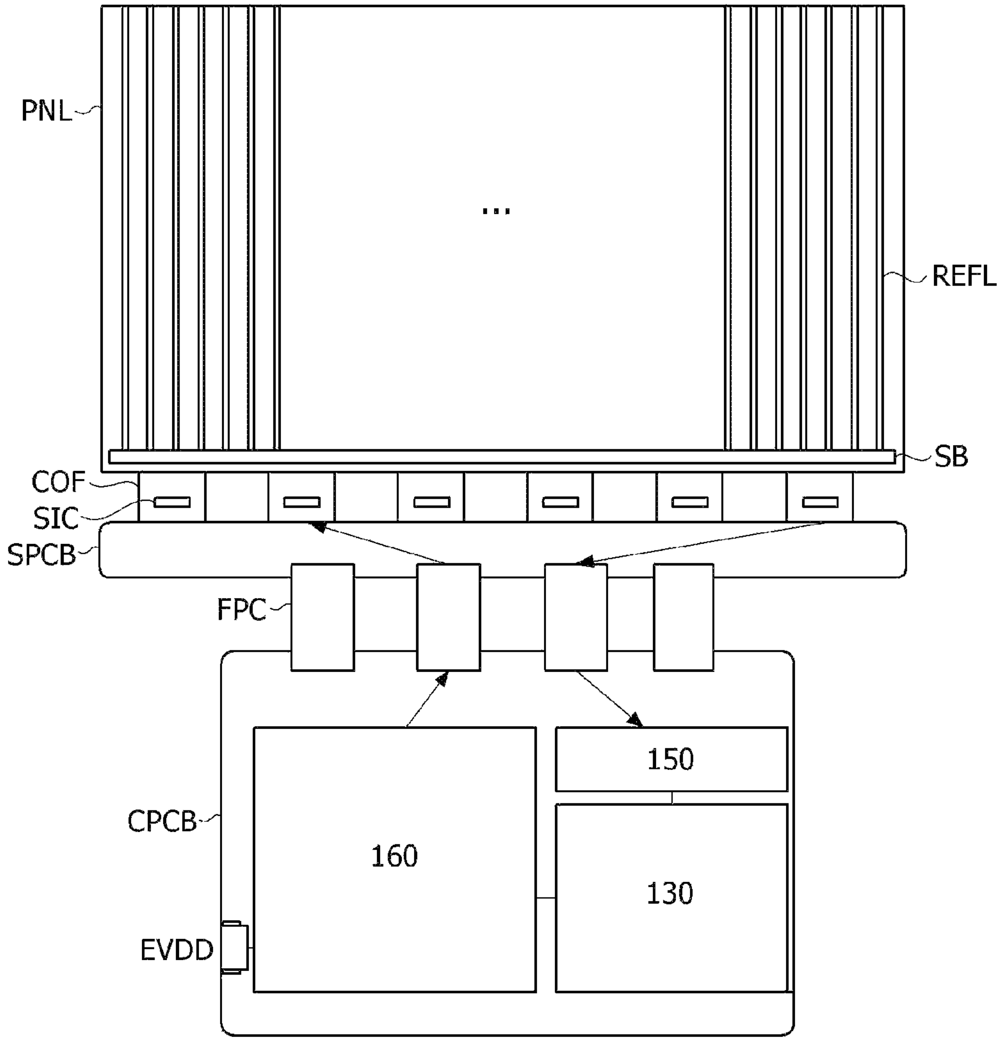
FIGS. 4, 5, 6A, 6B, 7, and 8 are views describing an operation principle of a sensing circuit according to the embodiment.

Referring to FIG. 4, a chip on film (COF) may be adhered to a display panel PNL. The COF includes a drive IC SIC and connects a source PCB SPCB to the display panel PNL. The drive IC SIC includes a data driver.

A timing controller 130 and a power supply unit 150 may be mounted on a control PCB CPCB. The control PCB CPCB may be connected to the source PCB SPCB through a flexible circuit film, for example, a flexible printed circuit (FPC).

The timing controller 130 may adjust the reference voltage Vref output from the power supply unit 150 on the basis of a result of comparing a reference voltage Vref sensed sensed from the display panel PNL and the reference voltage Vref output from the power supply unit 150 by including the above-described reference voltage controller.

The reference voltage Vref output from the power supply unit 150 may be supplied to the display panel PNL via the FPC, the source PCB SPCB, and the COF. Accordingly, in the display panel PNL, a lead-in unit IN of the reference voltage Vref is close to the drive IC SIC.

Reference voltage lines REFL on the display panel PNL may be connected to the power supply unit 150 via the COF, the source PCB SPCB, and the FPC. The reference voltage lines REFL may be grouped by a shorting bar SB. The shorting bar may be formed on one side of the display panel PNL, and may be formed as a line of glass (LOG) line on the display panel rather than in the drive IC SIC. The reference voltage lines REFL connected to all pixels on the display panel PNL may be connected to the shorting bar SB in one embodiment.

A sensing unit 160 senses a current flowing through a pixel power line to which a high potential voltage EVDD is applied when driving in a sensing mode after the power is turned off in one embodiment. The sensing unit 160 provides the sensed current to the timing controller 130.

Figure 5:
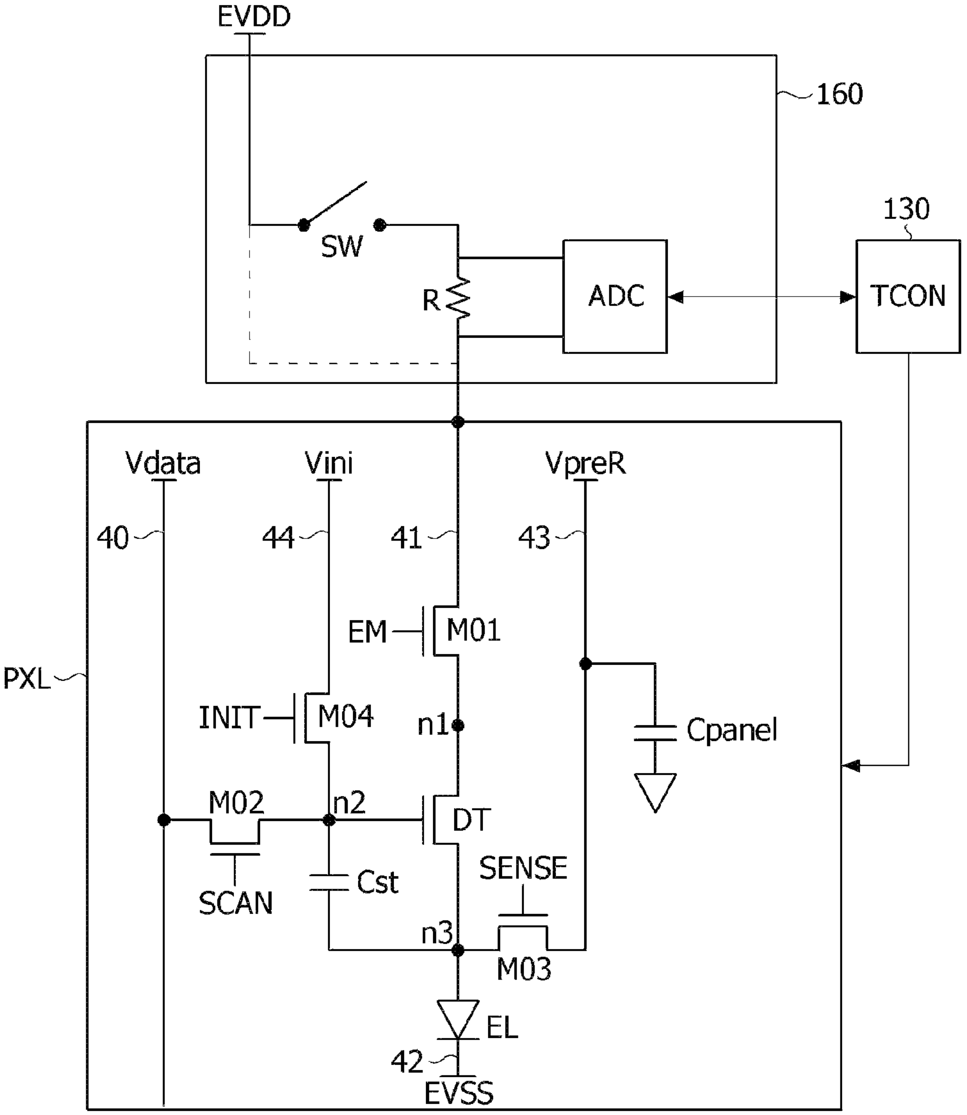

Referring to FIG. 5, the sensing unit 160 may include a resistor R connected to the pixel power line and an ADC connected to the resistor R in parallel. The sensing unit 160 may further include a switch SW connected between the pixel power line and the resistor R. The switch SW is turned off in a display mode and turned on in the sensing mode.

When the switch SW is turned off in the display mode, the high potential voltage EVDD is applied to a pixel PXL through the pixel power line as shown by the dotted line in FIG. 5. When the switch SW is turned on in the sensing mode, the high potential voltage EVDD is applied to the pixel PXL through the pixel power line and the resistor R, and a current flowing through the resistor R is sensed by the ADC. The ADS is configured to configured to convert a voltage difference across the resistor into a digital value during the sensing mode. In one embodiment, the voltage difference is indicative of the current flowing through the pixel power line during the sensing mode. The TCON 130 receives the digital value and generates a compensation value for a corresponding pixel block to compensate for a change in electrical characteristics of the pixels 101 included in a corresponding block by adding or multiplying the compensation value to pixel data of the input image.

Figure 6A:
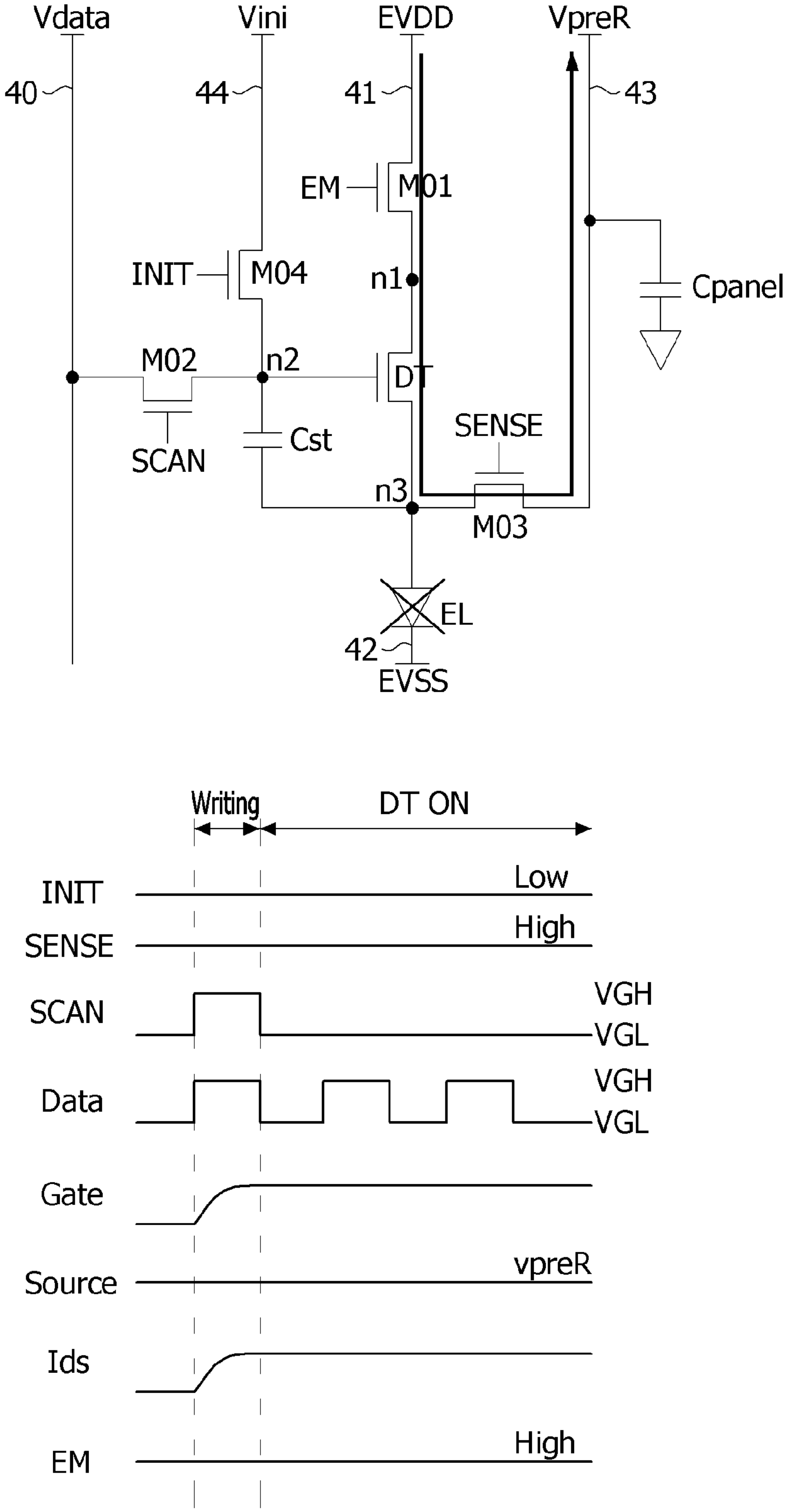

Referring to FIG. 6A, in the embodiment, when driving in the sensing mode, the gate-on voltage of the emission control signal EM is applied to the first switch element M01, the gate-on voltage of the scan pulse SCAN is applied to the second switch element M02, and a gate-on voltage of the sensing signal SENSE is applied to the third switch element M03. The gate-on voltages are applied to the first, second, and third switch elements M01, M02, and M03 and the first, second, and third switch elements M01, M02, and M03 are turned on to form a current path through the driving transistor DT through which the current flowing through the pixel driving voltage line 41 flows to the reference voltage line 43 instead of flowing to the light-emitting element EL.

Accordingly, in the embodiment, when driving in the sensing mode, current sensing may be performed without emitting light from the light-emitting element, and since light emission of the light-emitting element is suppressed, a visibility problem may be solved.

Figure 6B:
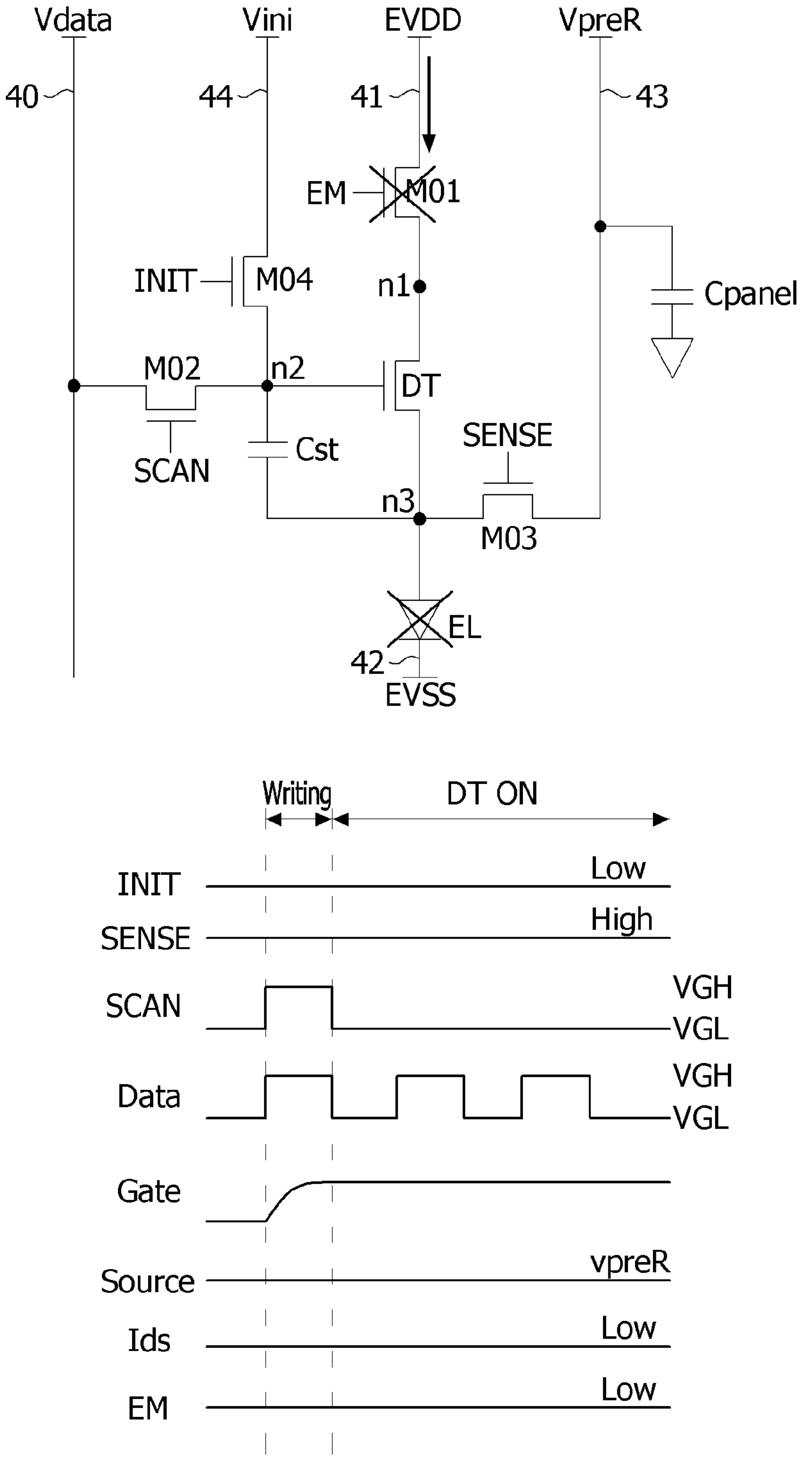

Referring to FIG. 6B, in the embodiment, when driving in the sensing mode, since a gate-off voltage of the emission control signal EM is applied to the first switch element M01, a current is prevented from flowing through the pixel driving voltage line 41 even when gate-on voltages are applied to the second and third switch elements M02 and M03 and the second and third switch elements M02 and M03 are turned on.

Like the above, the pixel circuit may be selected by the emission control signal EM when driving in the sensing mode. That is, an amount of flowing current may be measured by allowing the current to flow only through a selected pixel circuit.

Figure 7:
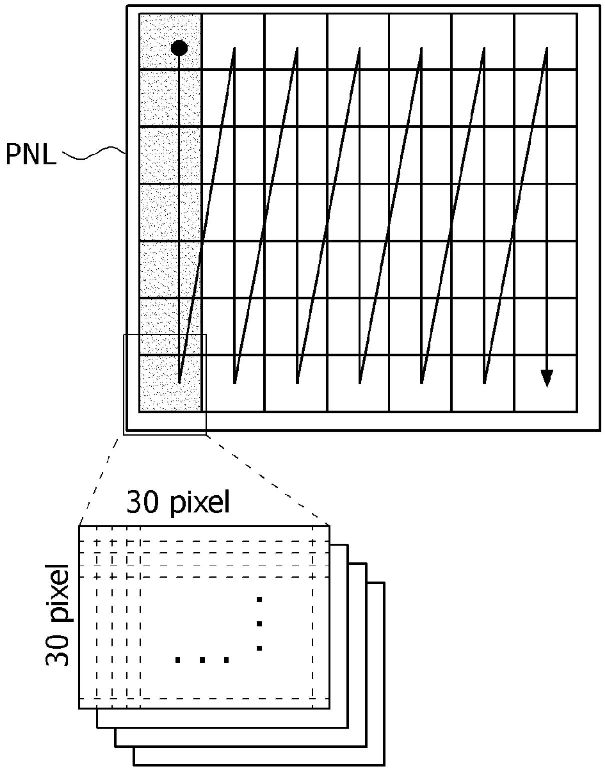

Referring to FIG. 7, the sensing unit senses the current in units of blocks including a predetermined number of pixels. Here, the block may have a square shape in which the number of pixels in a line direction X and the number of pixels in a column direction Y are the same, for example, a square shape of 30 pixels×30 pixels. The block is not limited to the square shape and may be implemented in various shapes.

The sensing unit 160 senses the current in units of blocks, and senses the current flowing through each block in a predetermined order. Different currents are sensed according to characteristics and deterioration levels of pixels included in each block.

A method of sensing the current in units of blocks may shorten an overall sensing time, and may be implemented with a simple structure compared to a method of sensing the current in units of pixels.

In the embodiment, a tact time and consistency will be improved by sensing the current flowing through each block in the column direction Y rather than sensing the current flowing through each block in the line direction X.

all pixels in a first block ONBLK in which the sensing is performed, and black data (e.g., black image data or black image data) is applied to all pixels in a second block OFFBLK in which the sensing is not performed.

Here, while the white data is applied to one block on the display panel, the black data is applied to the remaining blocks.

When the white data is applied to all pixels in the first block in which the sensing is performed, the sensing unit 160 senses the current flowing through the pixel driving voltage line. In this case, since the current flowing through the pixel driving voltage line has a large value in units of blocks, an integrator is not required in the sensing unit.

Figure 9A:
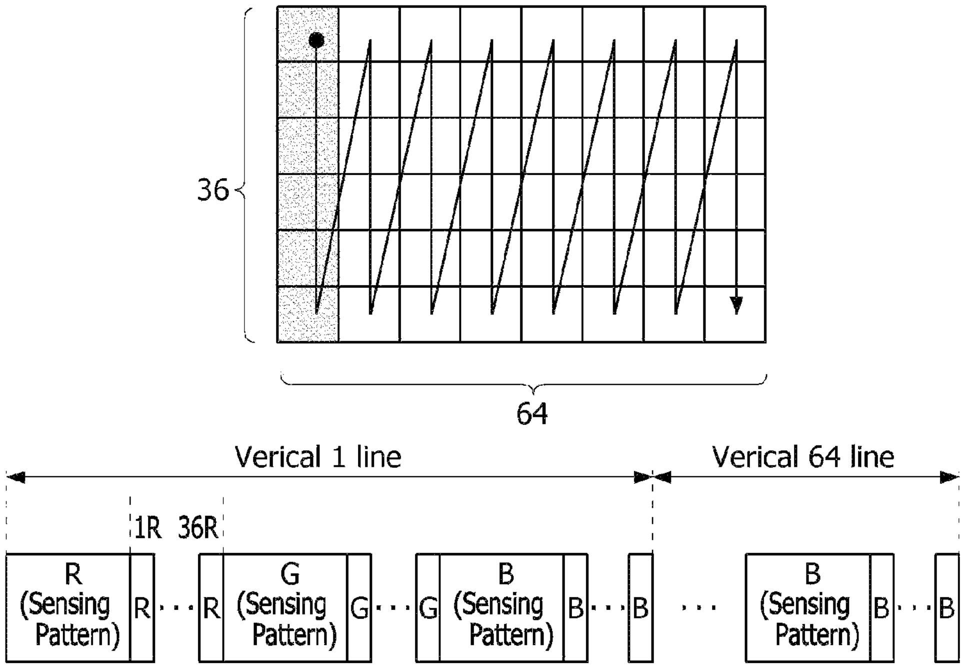
FIGS. 9A and 9B are views for comparatively describing a total sensing time according to an embodiment of the present disclosure.
Figure 9B:
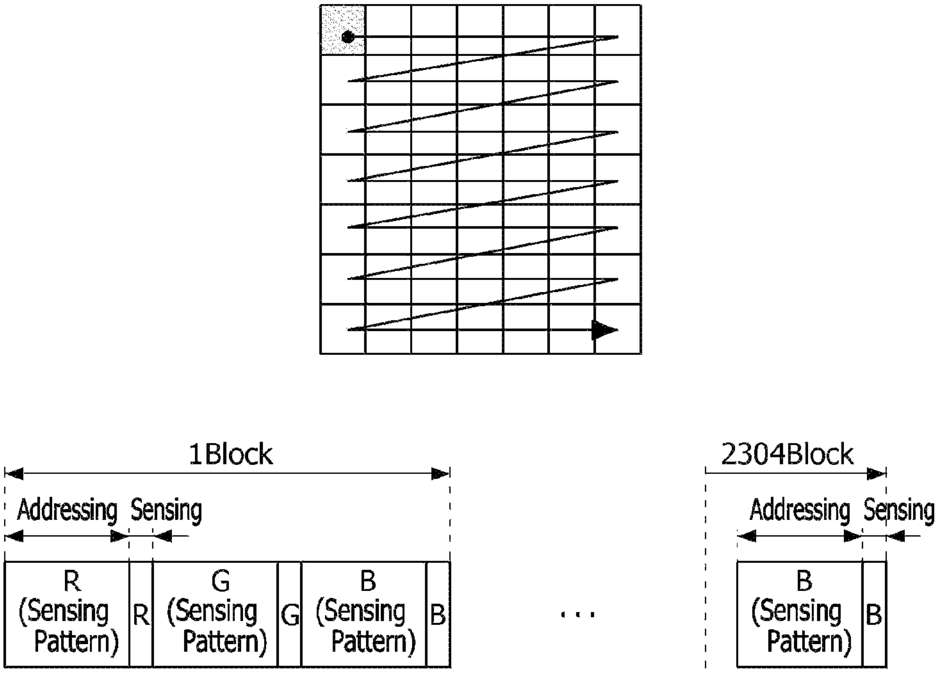

FIGS. 9A and 9B are views for comparatively describing a total sensing time.

Referring to FIG. 9A, in the embodiment, when driving in the sensing mode, sensing data, that is, white data, may be applied to each block in the column direction Y, and the current flowing through each block may be sensed.

In this case, a total sensing time Ttotal may be defined as in the following Equation 1.

$$Ttotal=[Taddressing+(Tsensing\times N\_Vblock)\times N\_subpxl\times N\_Hblock \qquad \text{[Equation 1]}$$

Here, Taddressing is a period of time required to apply the sensing data, Tsensing is a time period for sensing the current flowing through each block, N_Vblock is the number of blocks located in the column direction Y, N_subpxl is the number of sub-pixels in the blocks located in the column direction Y, and N_Hblock is the number of blocks located in the line direction X.

For example, when the total number of blocks is 36×64 and the number of pixels in each block is 30×30, for FHD 120 hz RGB, the total sensing time Ttotal is [8.33 ms+(2 ms×36)]×3×64, that is, 15.42 seconds.

Referring to FIG. 9B, in a comparative example, when driving in the sensing mode, sensing data, that is, white data, may be applied to each block in the line direction X, and the current flowing through each block may be sensed.

In this case, the total sensing time Ttotal may be defined as in the following Equation 2.

$$Ttotal=(Taddressing+Tsensing)\times N\_subpxl\times N\_Hblock\times N\_Vblock \qquad \text{[Equation 2]}$$

For example, when the number of entire blocks is 36×64 and the number of pixels in each block is 30×30, for FHD 120 hz RGB, the total sensing time Ttotal is 8.33 ms+2 ms)×3×64×36, that is, 71.4 seconds.

TABLE 1

| Classification | Comparative example | Embodiment |
|---|---|---|
| Addressing | Taddressing × N_Hblock × N_Vblock | Taddressing × N_Hblock |
| Sensing | N_Hblock × N_Vblock × Tsensing | |

Figure 8:
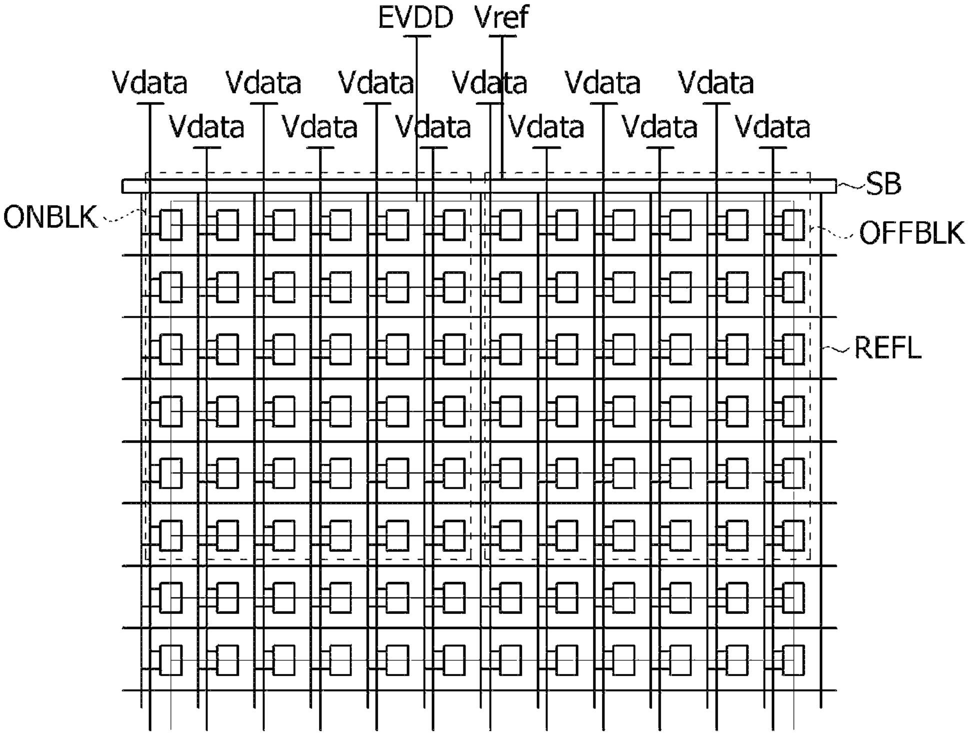

Referring to FIG. 8, in the embodiment, a pixel structure for sensing the current in units of blocks is shown. The reference voltage lines and the high potential voltage line are connected to all pixels on the display panel to be shared, and a data voltage line is connected to each of the pixels in the column direction Y.

Accordingly, a block in which sensing is performed according to whether data is applied may be selected even when the reference voltage and the high potential voltage are applied to all pixels on the display panel. For example, white data (e.g., white image data or first image data) is applied to As shown in Table 1, since there is a large difference in an addressing time between the embodiment and the comparative example, it can be seen that the total sensing time is significantly reduced in the embodiment compared to the comparative example.

FIGS. 10A to 10D are views illustrating a case in which a shape of the block is variously changed according to one embodiment.

Figure 10A:
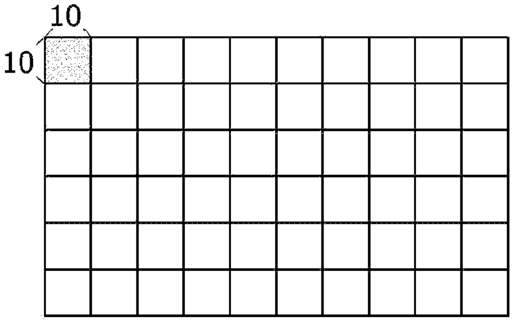
FIGS. 10A to 10D are views illustrating a case in which a shape of a block is variously changed according to an embodiment of the present disclosure.
Figure 10B:
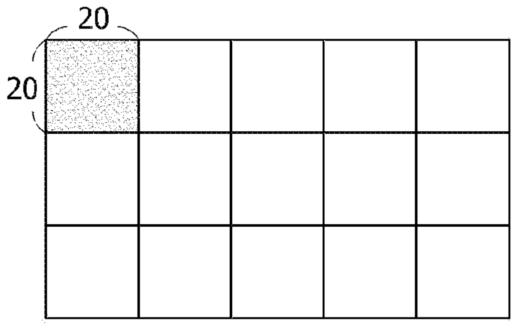

Referring to FIGS. 10A and 10B, a case in which a size of the block to be sensed is changed is shown. In FIG. 10A, a block is 10×10 pixels whereas in FIG. 10B a block is 20×20 pixels. In this case, the tact time may be shortened according to the size of the block as in the following Table 2.

TABLE 2

| Tact time for size of block (sec) | | |
|---|---|---|
| Block | Comparative example | Embodiment |
| 10 × 10 | 649 | 129 |
| 20 × 20 | 161 | 34 |
| 30 × 30 | 71 | 15 |
| 60 × 60 | 18 | 4 |

Figure 10C:
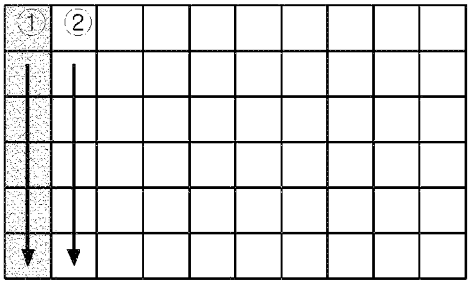
Figure 10D:
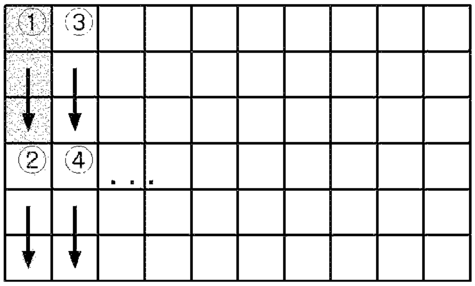

Referring to FIGS. 10C and 10D, the number of blocks to which data is applied can be changed. For example, the data voltage may be applied to each block in the column direction Y (e.g., FIG. 10C) or the blocks in the column direction Y may be divided into a plurality of groups (e.g., FIG. 10D) to apply the data voltage in units of each group. Like the above, since the tact time may be shortened compared to the comparative example with respect to the same block size, and the block size may become smaller with respect to the same tact time, consistency may increase. Accordingly, in the embodiment, various configurations for current sensing are possible, and it may be possible to change a design to an optimal configuration in consideration of tact time, block size, consistency, and the like.

FIGS. 11A to 11D are views for describing a principle of selecting a sensing region according to one embodiment.

Figure 11A:
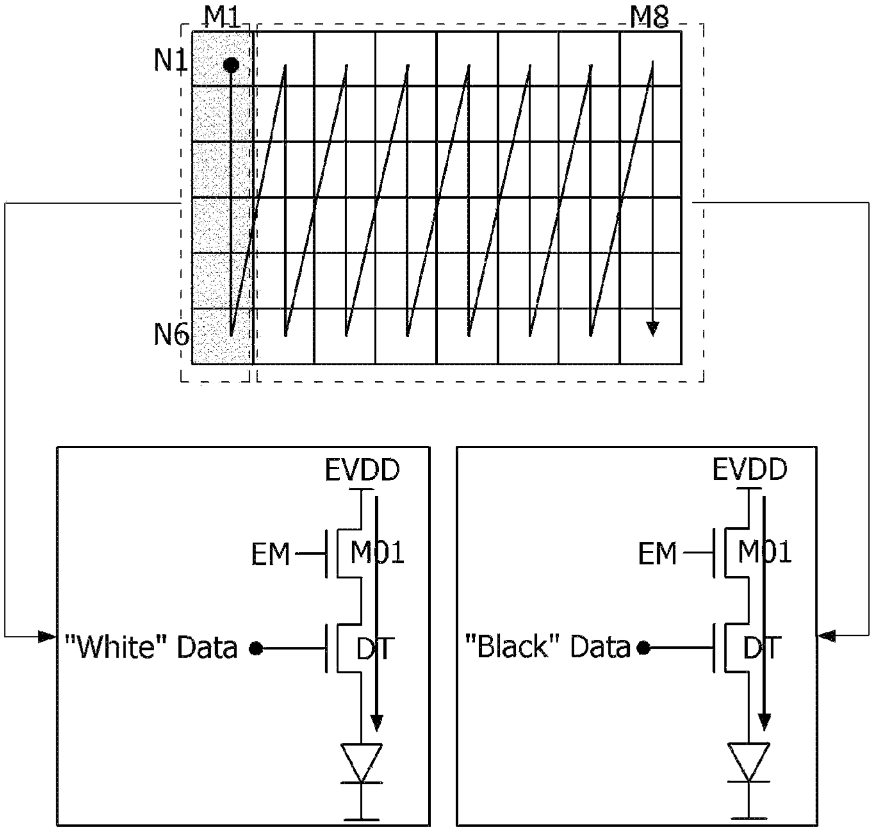
FIGS. 11A to 11D are views for describing a principle of selecting a sensing region according to an embodiment of the present disclosure.

Referring to FIG. 11A, in the embodiment, the sensing data, that is, white data, may be applied to pixels in a sensing region M1 to be sensed in a vertical direction or the column direction Y along the direction of the data line, and black data may be applied to pixels in non-sensing regions M2 to M8 not to be sensed.

In the embodiment, the sensing region to be sensed may be selected by applying the white data. A current may be sensed for each block included in the selected sensing region.

Figure 11B:
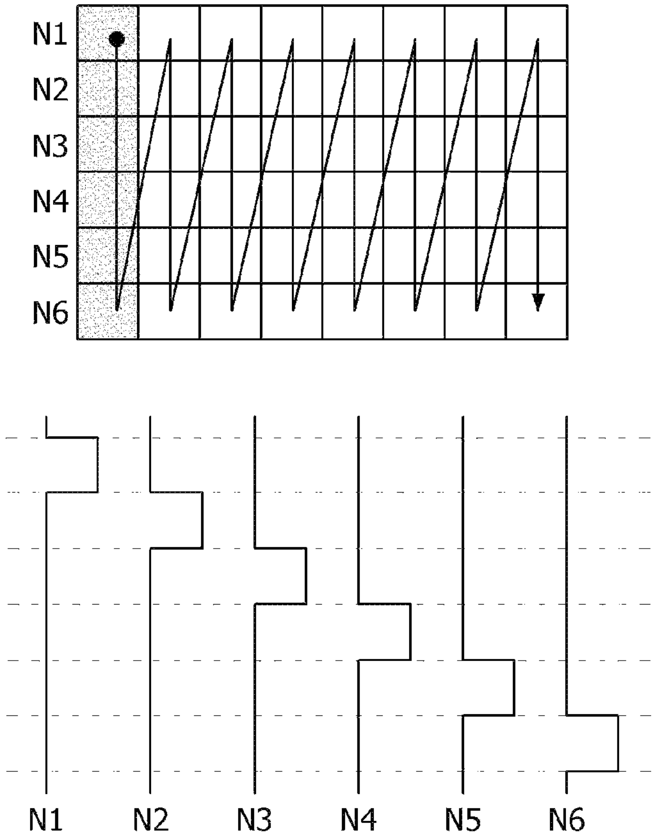

Referring to FIG. 11B, the current should be sensed in units of one block among the blocks included in the sensing region. In this case, the block may be selected using an emission control signal.

In the embodiment, the emission control signal for selecting blocks N1 to N6 included in the sensing region M1 disposed in the column direction Y along the data line may be sequentially applied.

Figure 11C:
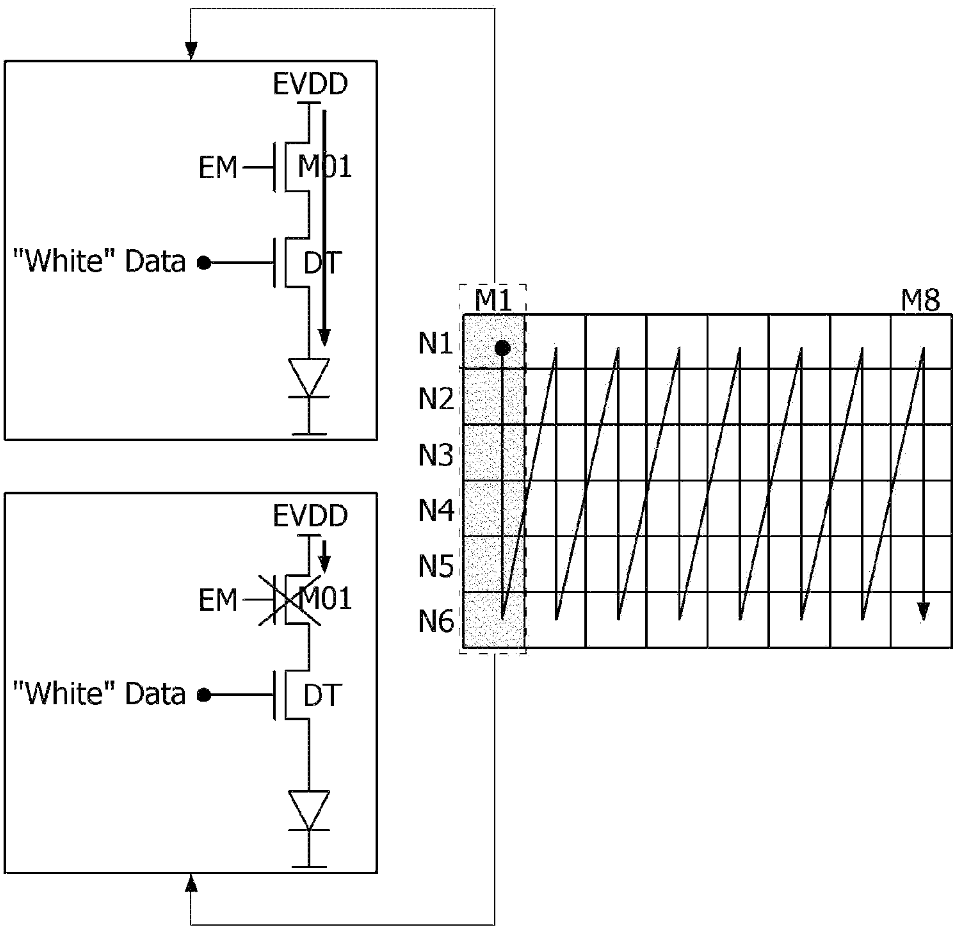

Referring to FIG. 11C, when a first block N1 included in the sensing region M1 is selected, a high voltage level of the emission control signal is applied to the first block N1 and thus a pixel driving voltage EVDD flows through the driving element, and a low voltage level of the emission control signal may be sequentially applied to second to sixth blocks N2 to N6 included in the sensing region M1.

In this case, since each of the sub-pixels of the first block N1 to be sensed in a block group is implemented with the circuit shown in FIG. 3, and thus the first switch element M01 is turned on by the high voltage level of the emission control signal, the pixel driving voltage EVDD may be applied to form a current path.

However, since each of the sub-pixels of the remaining blocks in the sensing region to be sensed is implemented with the circuit shown in FIG. 3, and thus the first switch element M01 is turned off by the low voltage level of the emission control signal, the pixel driving voltage EVDD is not applied and thus the current path may not be formed.

Figure 11D:
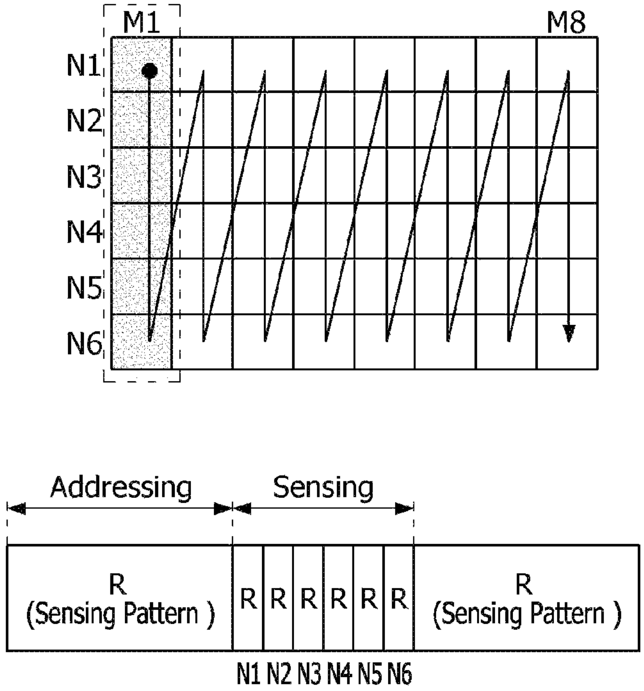

Referring to FIG. 11D, during a sensing section after an addressing section during which the white data is applied to the blocks N1 to N6 in the sensing region, the blocks N1, N2, N3, N4, N5, and N6 in the sensing region to be sensed may be sequentially driven to sense the current.

Figure 12:
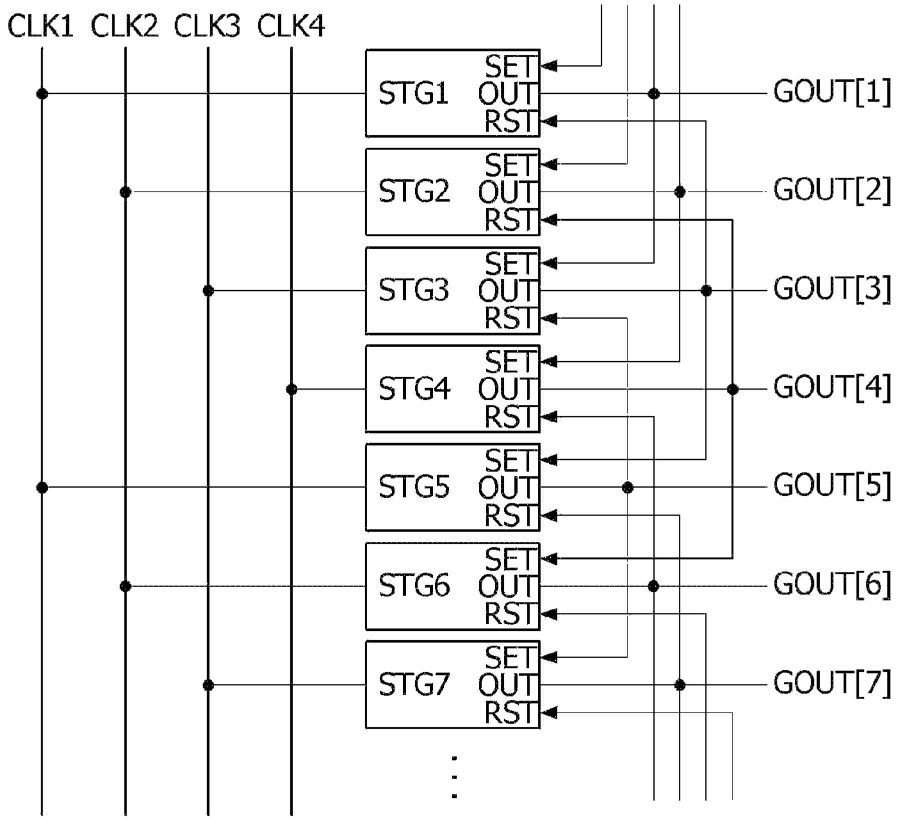
FIG. 12 is a view illustrating a shift register of a gate driver according to the embodiment of the present disclosure.
Figure 13:
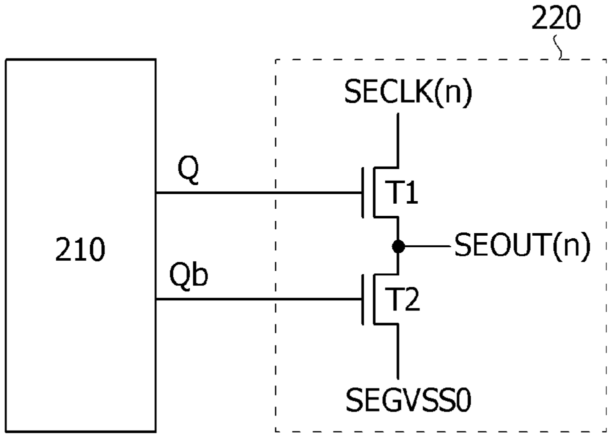
FIG. 13 is a view illustrating a signal transmission unit of a sensing driver according to the embodiment.
Figure 14:
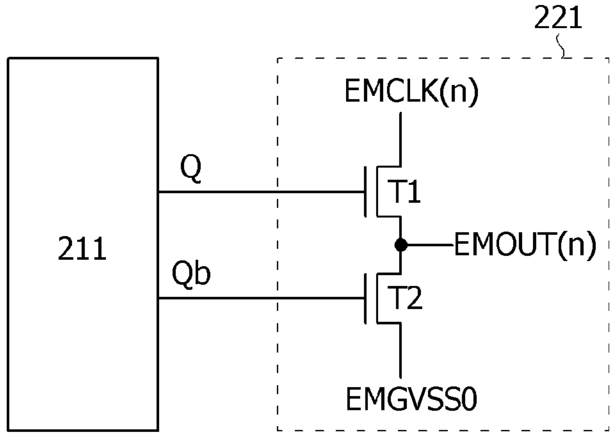
FIG. 14 is a view illustrating a signal transmission unit of an EM driver according to the embodiment.
Figure 15:
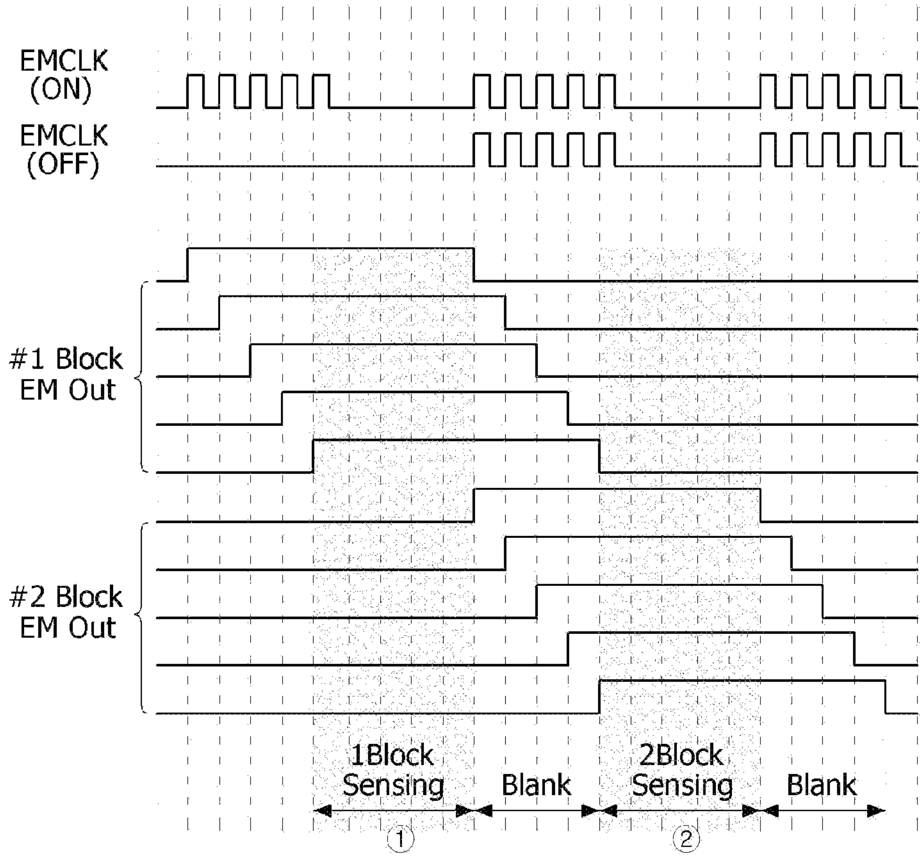
FIG. 15 is a waveform diagram illustrating an output signal of the signal transmission unit shown in FIG. 14 according to an embodiment of the present disclosure.

FIG. 12 is a view illustrating a shift register of a gate driver according to the embodiment of the present disclosure, FIG. 13 is a view illustrating a signal transmission unit of a sensing driver according to the embodiment, FIG. 14 is a view illustrating a signal transmission unit of an EM driver according to the embodiment, and FIG. 15 is a waveform diagram illustrating an output signal of the signal transmission unit shown in FIG. 14.

Referring to FIG. 12, a gate driver 120 according to the embodiment includes a plurality of signal processing units STG1, STG2, STG3, STG4, STG5, STG6 and STG7 which are cascade-connected via a carry line through which a carry signal is transmitted.

The timing controller 130 may adjust a width and a multi-output of an output signal GOUT of the gate driver using a start pulse Vst input to the gate driver 120.

Each of the signal processing units STG1, STG2, STG3, STG4, STG5, STG6 and STG7 receives a start pulse or a carry signal output from a previous odd-numbered or even-numbered signal processing unit and clock signals CLK1, CLK2, CLK3, and CLK4. A first signal processing unit STG1 starts to be driven according to the start pulse Vst, and the other signal processing units STG2, STG3, STG4, STG5, STG6 and STG7 receive the carry signal from the previous odd-numbered or even-numbered signal processing unit and start to be driven.

Referring to FIG. 13, each signal processing unit of the gate driver 120 according to the embodiment includes a first circuit unit 210 and a second circuit unit 220. The first circuit unit 210 charges or discharges a first control node (hereinafter referred to as a “Q node”) and a second control node (hereinafter referred to as a “Qb node”).

In this case, the first circuit unit 210 includes a control circuit which serves to control charging and discharging of the Q node Q and the Qb node Qb and an inverter circuit which inverts a voltage of the Q node Q and applies the voltage to the Qb node Qb. The inverter circuit includes a Qb node charging unit and a Qb node discharging unit.

The second circuit unit 220 outputs sensing signal SEOUT(n) in response to potentials of the Q node Q and the Qb node Qb.

The second circuit unit 220 includes first buffer transistors T1 and T2 which output the sensing signal SEOUT(n). The first buffer transistors T1 and T2 are divided into a first pull-up transistor T1 that is turned on based on the potential of the Q node Q and a first pull-down transistor T2 that is turned on based on the potential of the Qb node Qb. In the first pull-up transistor T1, a gate electrode is connected to the Q node Q, a first electrode is connected to a clock signal line SECLK(n), and a second electrode is connected to a first output terminal SEOUT(n). In the first pull-down transistor T2, a gate electrode is connected to the Qb node Qb, a first electrode is connected to the first output terminal SEOUT (n), and a second electrode is connected to a low potential voltage line SEGVSS0. The first buffer transistors T1 and T2 output the sensing signal SEOUT(n) based on a clock signal applied through the clock signal line SECLK(n) and a low potential voltage applied through the low potential voltage line SEGVSS0.

In this case, as shown in FIG. 6A, in the embodiment, when driving in the sensing mode, a voltage of the sensing signal is set to maintain a high voltage level so that a current path is formed to bypass the light-emitting element. For example, in the embodiment, when driving in the sensing mode, voltages applied to the clock signal line SECLK(n) and the low potential voltage line SEGVSS0 may be set to be high voltage levels.

Referring to FIG. 14, each signal transmission unit of the gate driver according to the embodiment includes a first circuit unit 211 and a second circuit unit 221. The first circuit unit 211 charges or discharges a first control node (hereinafter referred to as a "Q node") and a second control node (hereinafter referred to as a "Qb node").

In this case, the first circuit unit 211 includes a control circuit which serves to control charging and discharging of the Q node Q and the Qb node Qb and an inverter circuit which inverts a voltage of the Q node Q and applies the voltage to the Qb node Qb. The inverter circuit includes a Qb node charging unit and a Qb node discharging unit.

The second circuit unit 221 outputs emission control signal EMOUT(n) in response to potentials of the Q node Q and the Qb node Qb.

The second circuit unit 221 includes first buffer transistors T1 and T2 which output the emission control signal EMOUT (n). The first buffer transistors T1 and T2 are divided into a first pull-up transistor T1 that is turned on based on the potential of the Q node Q and a first pull-down transistor T2 that is turned on based on the potential of the Qb node Qb. In the first pull-up transistor T1, a gate electrode is connected to the Q node Q, a first electrode is connected to a clock signal line EMCLK(n), and a second electrode is connected to a first output terminal EMOUT(n). In the first pull-down transistor T2, a gate electrode is connected to the Qb node Qb, a first electrode is connected to the first output terminal EMOUT(n), and a second electrode is connected to a low potential voltage line EMGVSS0. The first buffer transistors T1 and T2 output the emission control signal EMOUT(n) based on a clock signal applied through the clock signal line EMCLK(n) and a low potential voltage applied through the low potential voltage line EMGVSS0.

Referring to FIG. 15, each of the signal processing units STG1, STG2, STG3, STG4, STG5, STG6 and STG7 sequentially outputs the emission control signal by shifting the start pulse or the carry signal output from a previous signal processing unit according to a timing of the clock signal. In this case, in the embodiment, the signal processing units may sequentially output the emission control signal in units of blocks.

Here, a case in which five pixel lines are included in one block is shown as an example.

For example, in a first sensing section (①), an emission control signal having a high voltage level may be applied according to a clock signal EMCLK(ON) from signal transmission units connected to the first block, and in a second sensing section (②), an emission control signal having a high voltage level may be applied according to the clock signal EMCLK(ON) from signal transmission units connected to the second block.

The emission control signal applied to the first block may be applied at a high voltage level according to a rising edge of the clock signal EMCLK(ON) in the first sensing section, and may be applied at a low voltage level according to the rising edge of the clock signal EMCLK(OFF) in the second sensing section. That is, the emission control signal from the signal transmission unit may be applied at the high voltage level only during a section in which a current amount of the corresponding block is sensed.

Accordingly, as shown in FIGS. 6A and 6B, in the embodiment, when driving in the sensing mode, since a voltage of the emission control signal is applied at a high voltage level to a pixel circuit located in a selected block in the sensing region, and at a low voltage level to a pixel circuit located in a non-selected block in the sensing region, the block may be selected by the emission control signal.

In one embodiment, a display device comprises: a plurality of pixels that are connected to a power line to which a pixel driving voltage is supplied, the plurality of pixels divided into a plurality of columns of pixel blocks that extend along a first direction and each pixel block including a different subset of pixels from the plurality of pixels, a plurality of data lines that extend in the first direction and are connected to the plurality of pixels, the plurality of data lines applying a plurality of data voltages of pixel data of an image to the plurality of pixels; a plurality of gate lines that are connected to the plurality of pixels and extend in a second direction that intersects the first direction, the plurality of gate lines applying gate signals to the plurality of pixels; a data driver configured to supply the plurality of data voltages of the image to the plurality of data lines during a display mode, and to supply sensing data to the plurality of data lines during a sensing mode; a gate driver configured to supply the gate signals to the plurality of gate lines; and a sensing circuit configured to sense current flowing through the power line that is connected to a respective subset of pixels included in each pixel block included in a column of pixel blocks from the plurality of columns of pixel blocks during the sensing mode, each of the respective subset of pixels included in each pixel block supplied the sensing data during the sensing mode.

In one embodiment, the sensing circuit sequentially senses each pixel block included in the column of pixel blocks during the sensing mode such that the respective subset of pixels included in each pixel block are supplied the sensing data and are sensed based on the current flowing through the power line according to the sensing data.

In one embodiment, the sensing data comprises white image data and the display panel driver is configured to supply the white image data to each pixel block from the column of pixel blocks that is being sensed and supplies black image data to remaining pixel blocks included in other columns of pixel blocks that are not being sensed.

In one embodiment, each of the plurality of pixels includes: a driving element including a first electrode of the driving element that is connected a first node, a gate electrode of the driving element that is connected to a second node, and a second electrode of the driving element that is connected to a third node; a first switch element including a first electrode of the first switch element that is connected to the power line to which the pixel driving voltage is applied, a gate electrode of the first switch element to which an emission signal is applied, and a second electrode of the first switch element that is connected to the first node; a light emitting element including an anode connected to the third node and a cathode to which a low-potential power supply voltage is applied; a capacitor between the second node and the third node; a second switch element including a first electrode of the second switch element that is connected to a data line to which a data voltage from the plurality of data voltages is applied, a gate electrode of the second switch element to which a scan pulse is applied, and a second electrode of the second switch element that is connected to the second node; and a third switch element including a first electrode of the third switch element that is connected to the third node, a gate electrode of the third switch element to which a sensing pulse is applied, and a second electrode of the third switch element that is connected to a reference line to which a reference voltage is applied.

In one embodiment, a respective first switch element included in each pixel of a target pixel block from the column of pixel blocks being sensed is turned on during the sensing mode responsive to the gate electrode of the respective first switch element being applied the emission signal at an on level, and a respective first switch element included in each pixel of remaining pixel blocks from the column of pixel blocks being sensed is turned off responsive to the gate electrode of the responsive first transistor being applied the emission signal at an off level.

In one embodiment, a respective first switch element included in each pixel of the remaining pixel blocks included in the other columns of pixel blocks that are supplied the black image data due to not being sensed is turned on during the sensing mode responsive to the gate electrode of the respective first switch element being applied the emission signal at the on level.

In one embodiment, a current flows through light emitting elements included in the plurality of pixels during the display mode, but the current does not flow through light emitting elements included in pixel blocks from the column of pixel blocks being sensed during the sensing mode.

In one embodiment, the sensing circuit includes: a resistor; a switch configured to connect the resistor to the power line in series during the sensing mode and configured to disconnect the resistor from the power line during the display mode; and an analog-to-digital converter connected to the resistor in parallel, the analog-to-digital converter configured to convert a voltage difference across the resistor into a digital value during the sensing mode, the voltage difference indicative of the current flowing through the power line during the sensing mode.

In one embodiment, the pixel data of the image is adjusted by a compensation value based on the digital value.

In one embodiment, the gate driver includes: a shift register configured to output the sensing pulse, the shift register including a plurality of signal processing units that each include: a first transistor including a gate electrode of the first transistor that is connected to a first control node of the signal processing unit, a first electrode of the first transistor connected to a clock node, and a second electrode of the first transistor connected to an output node from which the sensing pulse is outputted; and a second transistor including a gate electrode of the second transistor coupled to a second control node of the signal processing unit, a first electrode of the second transistor connected to the output node, and a second electrode of the second transistor connected to a voltage node, and wherein during the display mode, a clock that switches between an on voltage and an off voltage is inputted to the clock node, a low-potential reference voltage is applied to the voltage node, and during the sensing mode, the on voltage is applied to each of the clock node and the voltage node.

In one embodiment, a display device comprises: a plurality of pixels that are connected to a power line to which a pixel driving voltage is supplied; a plurality of data lines that extend in a first direction and are connected to the plurality of pixels, the plurality of data lines applying a plurality of data voltages of pixel data of an image to the plurality of pixels; a plurality of gate lines that are connected to the plurality of pixels and extend in a second direction that intersects the first direction, the plurality of gate lines applying gate signals to the plurality of pixels; a data driver configured to supply the plurality of data voltages of the image to the plurality of data lines during a display mode, and to supply sensing data to the plurality of data lines during a sensing mode; a gate driver configured to supply the gate signals to the plurality of gate lines; and a sensing circuit configured to sense current flowing through the power line that is connected to a subset of pixels from the plurality of pixels during the sensing mode, the subset of pixels arranged along the first direction.

In one embodiment, the plurality of pixels are divided into a plurality of columns of pixel blocks that extend along the first direction and each pixel block includes a different subset of pixels from the plurality of pixels.

In one embodiment, the subset of pixels is included in a pixel block from a column of pixel blocks being sensed, and pixels included in the column of pixel blocks are provided the sensing data including white image data, and pixels included in remaining columns of pixel blocks from the plurality of columns of pixel blocks that are not being sensed during the sensing mode are provided black image data.

In one embodiment, the sensing circuit sequentially senses each pixel block included in the column of pixel blocks being sensed during the sensing mode such that respective subset of pixels included in each pixel block are supplied the white image data and are sensed based on the sensed current flowing through the power line according to the white image data.

In one embodiment, each of the plurality of pixels includes: a driving element including a first electrode of the driving element that is connected a first node, a gate electrode of the driving element that is connected to a second node, and a second electrode of the driving element that is connected to a third node; a first switch element including a first electrode of the first switch element that is connected to the power line to which the pixel driving voltage is applied, a gate electrode of the first switch element to which an emission signal is applied, and a second electrode of the first switch element that is connected to the first node; a light emitting element including an anode connected to the third node and a cathode to which a low-potential power supply voltage is applied; a capacitor between the second node and the third node; a second switch element including a first electrode of the second switch element that is connected to a data line to which a data voltage from the plurality of data voltages is applied, a gate electrode of the second switch element to which a scan pulse is applied, and a second electrode of the second switch element that is connected to the second node; and a third switch element including a first electrode of the third switch element that is connected to the third node, a gate electrode of the third switch element to which a sensing pulse is applied, and a second electrode of the third switch element that is connected to a second power line from the plurality of power lines to which a reference voltage is applied.

In one embodiment, a respective first switch element included in each pixel of a target pixel block from the column of pixel blocks being sensed is turned on during the sensing mode responsive to the gate electrode of the respective first switch element being applied the emission signal at an on level, and a respective first switch element included in remaining pixel blocks from the column of pixel blocks being sensed is turned off responsive to the gate electrode of the responsive first element being applied the emission signal at an off level.

In one embodiment, a respective first switch element included in each pixel of the remaining pixel blocks included in the remaining columns of pixel blocks that are supplied the black image data due to not being sensed is turned on during the sensing mode responsive to the gate electrode of the respective first switch transistor being applied the emission signal at the on level.

In one embodiment, a sensing circuit comprises: a resistor; and a switch configured to serially connect the resistor to a power line that supplies a pixel driving voltage to a plurality of pixels of a display panel that are divided into a plurality of columns of pixel blocks during a sensing period, and configured to disconnect the resistor from the power line during a display period during which an image is displayed by the display panel, wherein the sensing circuit is configured to sequentially sense each pixel block included in a column of pixel blocks during the sensing period by measuring a current flowing through the power line connected to a subset of pixels from the plurality of the pixels included in a target pixel block from the column responsive to sensing data being applied to the subset of pixels during the sensing mode.

In one embodiment, the sensing circuit further comprises: an analog-to-digital converter connected to the resistor in parallel, the analog-to-digital converter configured to convert a voltage difference across the resistor into a digital value during the sensing mode responsive to the current flowing through the power line.

In one embodiment, pixel data of the image is adjusted by a compensation value based on the digital value.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:

a plurality of pixels that are connected to a power line to which a pixel driving voltage is supplied, the plurality of pixels divided into a plurality of columns of pixel blocks that extend along a first direction and each pixel block including a different subset of pixels from the plurality of pixels where the different subset of pixels in the pixel block are arranged in a plurality of columns of pixels within the pixel block, a plurality of data lines that extend in the first direction and are connected to the plurality of pixels, the plurality of data lines applying a plurality of data voltages of pixel data of an image to the plurality of pixels;

a plurality of gate lines that are connected to the plurality of pixels and extend in a second direction that intersects the first direction, the plurality of gate lines applying gate signals to the plurality of pixels;

a data driver configured to supply the plurality of data voltages of the image to the plurality of data lines during a display mode, and to supply sensing data to the plurality of data lines during a sensing mode;

a gate driver configured to supply the gate signals to the plurality of gate lines; and a sensing circuit configured to sense current flowing through the power line that is connected to a respective subset of pixels included in each pixel block included in a column of pixel blocks from the plurality of columns of pixel blocks during the sensing mode, each of the respective subset of pixels included in each pixel block is supplied the sensing data during the sensing mode and at least one light emitting element included in a pixel from the respective subset of pixels that are arranged in the plurality of columns of pixels is configured to receive the sensing data but not emit light during the sensing mode.

2. The display device of claim 1, wherein the sensing circuit sequentially senses each pixel block included in the column of pixel blocks during the sensing mode such that the respective subset of pixels included in each pixel block are supplied the sensing data and are sensed based on the current flowing through the power line according to the sensing data.

3. The display device of claim 2, wherein the sensing data comprises white image data and the display panel driver is configured to supply the white image data to each pixel block from the column of pixel blocks that is being sensed and supplies black image data to remaining pixel blocks included in other columns of pixel blocks that are not being sensed.

4. The display device of claim 3, wherein each of the plurality of pixels includes:

a driving element including a first electrode of the driving element that is connected a first node, a gate electrode of the driving element that is connected to a second node, and a second electrode of the driving element that is connected to a third node;

a first switch element including a first electrode of the first switch element that is connected to the power line to which the pixel driving voltage is applied, a gate electrode of the first switch element to which an emission signal is applied, and a second electrode of the first switch element that is connected to the first node;

a light emitting element including an anode connected to the third node and a cathode to which a low-potential power supply voltage is applied;

a capacitor between the second node and the third node;

a second switch element including a first electrode of the second switch element that is connected to a data line to which a data voltage from the plurality of data voltages is applied, a gate electrode of the second switch element to which a scan pulse is applied, and a second electrode of the second switch element that is connected to the second node; and a third switch element including a first electrode of the third switch element that is connected to the third node, a gate electrode of the third switch element to which a sensing pulse is applied, and a second electrode of the third switch element that is connected to a reference line to which a reference voltage is applied.

5. The display device of claim 4, wherein a respective first switch element included in each pixel of a target pixel block from the column of pixel blocks being sensed is turned on during the sensing mode responsive to the gate electrode of the respective first switch element being applied the emission signal at an on level, and a respective first switch element included in each pixel of remaining pixel blocks from the column of pixel blocks being sensed is turned off responsive to the gate electrode of the responsive first transistor being applied the emission signal at an off level.

6. The display device of claim 5, wherein a respective first switch element included in each pixel of the remaining pixel blocks included in the other columns of pixel blocks that are supplied the black image data due to not being sensed is turned on during the sensing mode responsive to the gate electrode of the respective first switch element being applied the emission signal at the on level.

7. The display device of claim 6, wherein a current flows through light emitting elements included in the plurality of pixels during the display mode, but the current does not flow through light emitting elements included in pixel blocks from the column of pixel blocks being sensed during the sensing mode.

8. The display device of claim 4, wherein the gate driver includes:

a shift register configured to output the sensing pulse, the shift register including a plurality of signal processing units that each include:

a first transistor including a gate electrode of the first transistor that is connected to a first control node of the signal processing unit, a first electrode of the first transistor connected to a clock node, and a second electrode of the first transistor connected to an output node from which the sensing pulse is outputted; and a second transistor including a gate electrode of the second transistor coupled to a second control node of the signal processing unit, a first electrode of the second transistor connected to the output node, and a second electrode of the second transistor connected to a voltage node, and wherein during the display mode, a clock that switches between an on voltage and an off voltage is inputted to the clock node, a low-potential reference voltage is applied to the voltage node, and during the sensing mode, the on voltage is applied to each of the clock node and the voltage node.

9. The display device of claim 1, wherein the sensing circuit includes:

a resistor;

a switch configured to connect the resistor to the power line in series during the sensing mode and configured to disconnect the resistor from the power line during the display mode; and an analog-to-digital converter connected to the resistor in parallel, the analog-to-digital converter configured to convert a voltage difference across the resistor into a digital value during the sensing mode, the voltage difference indicative of the current flowing through the power line during the sensing mode.

10. The display device of claim 9, wherein the pixel data of the image is adjusted by a compensation value based on the digital value.

11. A display device comprising:

a plurality of pixels that are connected to a power line to which a pixel driving voltage is supplied;

a plurality of data lines that extend in a first direction and are connected to the plurality of pixels, the plurality of data lines applying a plurality of data voltages of pixel data of an image to the plurality of pixels;

a plurality of gate lines that are connected to the plurality of pixels and extend in a second direction that intersects the first direction, the plurality of gate lines applying gate signals to the plurality of pixels;

a data driver configured to supply the plurality of data voltages of the image to the plurality of data lines during a display mode, and to supply sensing data to the plurality of data lines during a sensing mode;

a gate driver configured to supply the gate signals to the plurality of gate lines; and a sensing circuit configured to sense current flowing through the power line that is connected to a subset of pixels from the plurality of pixels during the sensing mode, the subset of pixels arranged in a plurality of of columns of pixels along the first direction and at least one light emitting element included in a pixel from the subset of pixels is configured to receive the sensing data but not emit light during the sensing mode.

12. The display device of claim 11, wherein the plurality of pixels are divided into a plurality of columns of pixel blocks that extend along the first direction and each pixel block includes a different subset of pixels from the plurality of pixels.

13. The display device of claim 12, wherein the subset of pixels is included in a pixel block from a column of pixel blocks being sensed, and pixels included in the column of pixel blocks are provided the sensing data including white image data, and pixels included in remaining columns of pixel blocks from the plurality of columns of pixel blocks that are not being sensed during the sensing mode are provided black image data.

14. The display device of claim 13, wherein the sensing circuit sequentially senses each pixel block included in the column of pixel blocks being sensed during the sensing mode such that respective subset of pixels included in each pixel block are supplied the white image data and are sensed based on the sensed current flowing through the power line according to the white image data.

15. The display device of claim 14, wherein each of the plurality of pixels includes:

a driving element including a first electrode of the driving element that is connected a first node, a gate electrode of the driving element that is connected to a second node, and a second electrode of the driving element that is connected to a third node;

a first switch element including a first electrode of the first switch element that is connected to the power line to which the pixel driving voltage is applied, a gate electrode of the first switch element to which an emission signal is applied, and a second electrode of the first switch element that is connected to the first node;

a light emitting element including an anode connected to the third node and a cathode to which a low-potential power supply voltage is applied;

a capacitor between the second node and the third node;

a second switch element including a first electrode of the second switch element that is connected to a data line to which a data voltage from the plurality of data voltages is applied, a gate electrode of the second switch element to which a scan pulse is applied, and a second electrode of the second switch element that is connected to the second node; and a third switch element including a first electrode of the third switch element that is connected to the third node, a gate electrode of the third switch element to which a sensing pulse is applied, and a second electrode of the third switch element that is connected to a second power line from the plurality of power lines to which a reference voltage is applied.

16. The display device of claim 15, wherein a respective first switch element included in each pixel of a target pixel block from the column of pixel blocks being sensed is turned on during the sensing mode responsive to the gate electrode of the respective first switch element being applied the emission signal at an on level, and a respective first switch element included in remaining pixel blocks from the column of pixel blocks being sensed is turned off responsive to the gate electrode of the responsive first element being applied the emission signal at an off level.

17. The display device of claim 16, wherein a respective first switch element included in each pixel of the remaining pixel blocks included in the remaining columns of pixel blocks that are supplied the black image data due to not being sensed is turned on during the sensing mode responsive to the gate electrode of the respective first switch transistor being applied the emission signal at the on level.

18. A sensing circuit comprising:

a resistor; and a switch configured to serially connect the resistor to a power line that supplies a pixel driving voltage to a plurality of pixels of a display panel that are divided into a plurality of columns of pixel blocks during a sensing period, and configured to disconnect the resistor from the power line during a display period during which an image is displayed by the display panel, wherein the sensing circuit is configured to sequentially sense each pixel block included in a column of pixel blocks during the sensing period by measuring a current flowing through the power line connected to a subset of pixels from the plurality of the pixels included in a target pixel block from the column responsive to sensing data being applied to the subset of pixels during the sensing mode.

19. The sensing circuit of claim 18, further comprising:

an analog-to-digital converter connected to the resistor in parallel, the analog-to-digital converter configured to convert a voltage difference across the resistor into a digital value during the sensing mode responsive to the current flowing through the power line.

20. The sensing circuit of claim 19, wherein pixel data of the image is adjusted by a compensation value based on the digital value.

* * * * *